(12) United States Patent
Moataz

(10) Patent No.: US 12,717,956 B2
(45) Date of Patent: *Aug. 25, 2026

(54) SYSTEMS AND METHODS USING EMULATION FOR END TO END ENCRYPTION

(71) Applicant: MongoDB, Inc., New York, NY (US)

(72) Inventor: Tarik Moataz, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,135

(22) Filed: Apr. 26, 2024

(65) Prior Publication Data

US 2024/0289485 A1 Aug. 29, 2024

Related U.S. Application Data

(63) Continuation of application No. 17/570,730, filed on Jan. 7, 2022, now Pat. No. 12,039,073, which is a continuation-in-part of application No. 17/563,425, filed on Dec. 28, 2021, which is a continuation-in-part of application No. 17/514,681, filed on Oct. 29, 2021, now abandoned, said application No. 17/570,730 is a continuation-in-part of application No. 17/514,681, filed on Oct. 29, 2021, now abandoned.

(60) Provisional application No. 63/135,053, filed on Jan. 8, 2021, provisional application No. 63/132,063, filed on Dec. 30, 2020, provisional application No. 63/131,487, filed on Dec. 29, 2020.

(51) Int. Cl.

*G06F 21/62* (2013.01)
*G06F 16/21* (2019.01)

(52) U.S. Cl.

CPC ........ *G06F 21/6227* (2013.01); *G06F 16/213* (2019.01)

(58) Field of Classification Search

None

See application file for complete search history.

(56) References Cited

U.S. PATENT DOCUMENTS 9,213,867 B2 12/2015 Ramamurthy et al.
10,846,411 B2 11/2020 Horowitz et al.
(Continued)

OTHER PUBLICATIONS

U.S. Appl. No. 18/075,873, filed Dec. 6, 2022, George.
(Continued)

*Primary Examiner* — Brandon Hoffman
(74) *Attorney, Agent, or Firm* — Wolf, Greenfield & Sacks, P.C.

(57) ABSTRACT

Methods and system implement solutions for integrating encryption and emulation into native database formats and/or architectures. “Native” database is used to describe a database that has not been designed for end to end encryption, an off the shelf database deployment, and/or a commercially available database. According to some embodiments, various encryption systems and methods employ emulation operations to enable a native database and native database functions to leverage full encryption primitives. Various aspects integrate emulation operations into standard database implementations, where the emulation enables native database functions to operate on entirely encrypted data.

20 Claims, 15 Drawing Sheets

(56) References Cited

U.S. PATENT DOCUMENTS

| | | | |
|---|---|---|---|
| 11,269,824 B1 | 3/2022 | Waas et al. | |
| 12,039,073 B2 | 7/2024 | Kamara et al. | |
| 2015/0188949 A1 | 7/2015 | Mahaffey | |
| 2016/0314212 A1 | 10/2016 | Menday et al. | |
| 2017/0235969 A1 | 8/2017 | Kamara et al. | |
| 2020/0285777 A1* | 9/2020 | Heller | G06F 12/0882 |
| 2022/0207171 A1 | 6/2022 | Moataz | |
| 2022/0215115 A1 | 7/2022 | Moataz | |
| 2022/0222184 A1 | 7/2022 | Irwin | |
| 2023/0055992 A1 | 2/2023 | Vinayagamurthy | |
| 2023/0067981 A1 | 3/2023 | Varbedian | |
| 2023/0177177 A1 | 6/2023 | George et al. | |
| 2023/0315896 A1 | 10/2023 | Kamara et al. | |
| 2023/0315897 A1 | 10/2023 | Kamara et al. | |
| 2023/0325524 A1 | 10/2023 | Kamara et al. | |

OTHER PUBLICATIONS

U.S. Appl. No. 17/563,425, filed Dec. 28, 2021, Moataz.

U.S. Appl. No. 18/328,867, filed Jun. 5, 2023, Kamara et al.

U.S. Appl. No. 18/328,878, filed Jun. 5, 2023, Kamara et al.

U.S. Appl. No. 18/328,907, filed Jun. 5, 2023, Kamara et al.

Amjad et al., Dynamic vol. Hiding Encrypted Multi-Maps with Applications to Searchable Encryption. Google. Jun. 1, 20210. 31 pages.

Kamara et al., Computationally vol. Hiding Structure Encryption. International Conference on the Theory and Application of Cryptographic Techniques. May 19, 2019. 30 pages.

Patel et al., Mitigating Leakage in Secure Cloud-Hosted Data Structures: Volume-Hiding for Multi-Maps via Hashing. ACM SIGSAC Conference. Nov. 2019. 26 pages.

Wang et al., Practical Volume-Hiding Encrypted Multi-Maps with Optimal Overhead and Beyond. Association for Computing Machinery. Nov. 7, 2022. 2825-2839.

Wong et al., Secure query processing with data interoperability in a cloud database environment. In Proceedings of the 2014 ACM SIGMOD international conference on Management of data. 1395-1406.

Amjad et al., Breach-Resistant Structured Encryption. Proceedings on Privacy Enhancing Technologies. Sep. 16, 2018(1):245-65. doi 10.2478/popets-2019-0014.

Boelter et al., A Secure One-Roundtrip Index for Range Queries. Technical Report 2016/568, IACR ePrint Cryptography Archive, 2016.

Boldyreva et al., Order-Preserving Symmetric Encryption. Order-preserving symmetric encryption. 2009. Advances in Cryptology EUROCRYPT. pp. 224-241.

Boneh et al., Semantically Secure Order-Revealing Encryption: Multi-Input Functional Encryption Without Obfuscation. EUROCRYPT. 2015. pp. 563-594.

Bost et al., Forward and Backward Private Searchable Encryption from Constrained 2017 Cryptographic Primitives, 2017.

Bost., Sophos—forward Secure Searchable Encryption*. 23rd ACM Conference on Computer and Communications Security. 2016. Doi: 10.1145/2976749.2978303. 19 Pages.

Cash et al., Dynamic Searchable Encryption in Very-Large Databases: Data Structures and Implementation. Network and Distributed System Security Symposium. Feb. 23-26, 2014. ISBN: 1-891562-35-5. 16 Pages.

Chase et al., Structured encryption and controlled disclosure. Advances in Cryptology.2010.6477:577-94.

Demertzis et al. Practical Private Range Search Revisited. Proceedings of the 2016 International Conference on Management of Data. 2016. pp. 185-198. Doi.org/10.1145/2882903.2882911.

Faber et al. Rich Queries on Encrypted Data: Beyond Exact Matches*. European Symposium on research in computer security. 2015.pp. 123-145.

Goldreich et al., Software Protection and Simulation on Oblivious RAMs. Journal of the ACM.1996.43(3):431-473.

Grubbs et al. Learning to Reconstruct: Statistical Learning Theory and Encrypted Database Attacks. 2019 IEEE Symposium on Security and Privacy (SP), pp. 1067-1083.

Grubbs et al., Pump up the Volume: Practical Database Reconstruction from Volume Leakage on Range Queries. Proceedings of the 2018 ACM SIGSAC Conference on Computer and Communications Security, pp. 315-331, 2018.

Ishai et al., Private Large-Scale Databases with Distributed Searchable Symmetric Encryption. Cryptographers' Track at the RSA Conference. 2016. pp. 90-107.

Kamara et al., An optimal relational database encryption scheme. IACR Cryptol. ePrint Arch., 2020:274.

Kamara et al., Cryptographic Cloud Storage. Workshop on Real-Life Cryptographic Protocols and Standardization. 2010. pp. 136-149.

Kamara et al., SQL on Structurally Encrypted Databases. Technical Report 2016/453, IACR ePrint Cryptography Archive. 58 Pages.

Kellaris et al., Generic Attacks on Secure Outsourced Databases. In ACM Conference on Computer and Communications Security. 2016. 12 Pages.

Lacharite' et al., Improved Reconstruction Attacks on Encrypted Data Using Range Query Leakage. 2018. IEEE Symposium on Security and Privacy (SP), pp. 297-314.

Moataz et al., Oblivious substring search with updates. IACR Cryptol. ePrint Arch., 2015:722.

Naveed et al., Inference Attacks on Property-Preserving Encrypted Databases. ACM Conference on Computer and Communications Security (CCS), 2015. pp. 644-655.

Pappas et al., Blind Seer: A Scalable Private DBMS. Security and Privacy (SP), 2014 IEEE Symposium. pp. 359-374.

Song et al., Practical Techniques for Searches on Encrypted Data*. IEEE Symposium on Research in Security and Privacy. 2000. pp. 44-55 2000.

Zhao et al., Encrypted databases: From theory to systems. Conference on Innovative Data Systems Research. 2021. 7 Pages.

* cited by examiner

Figure 1A:
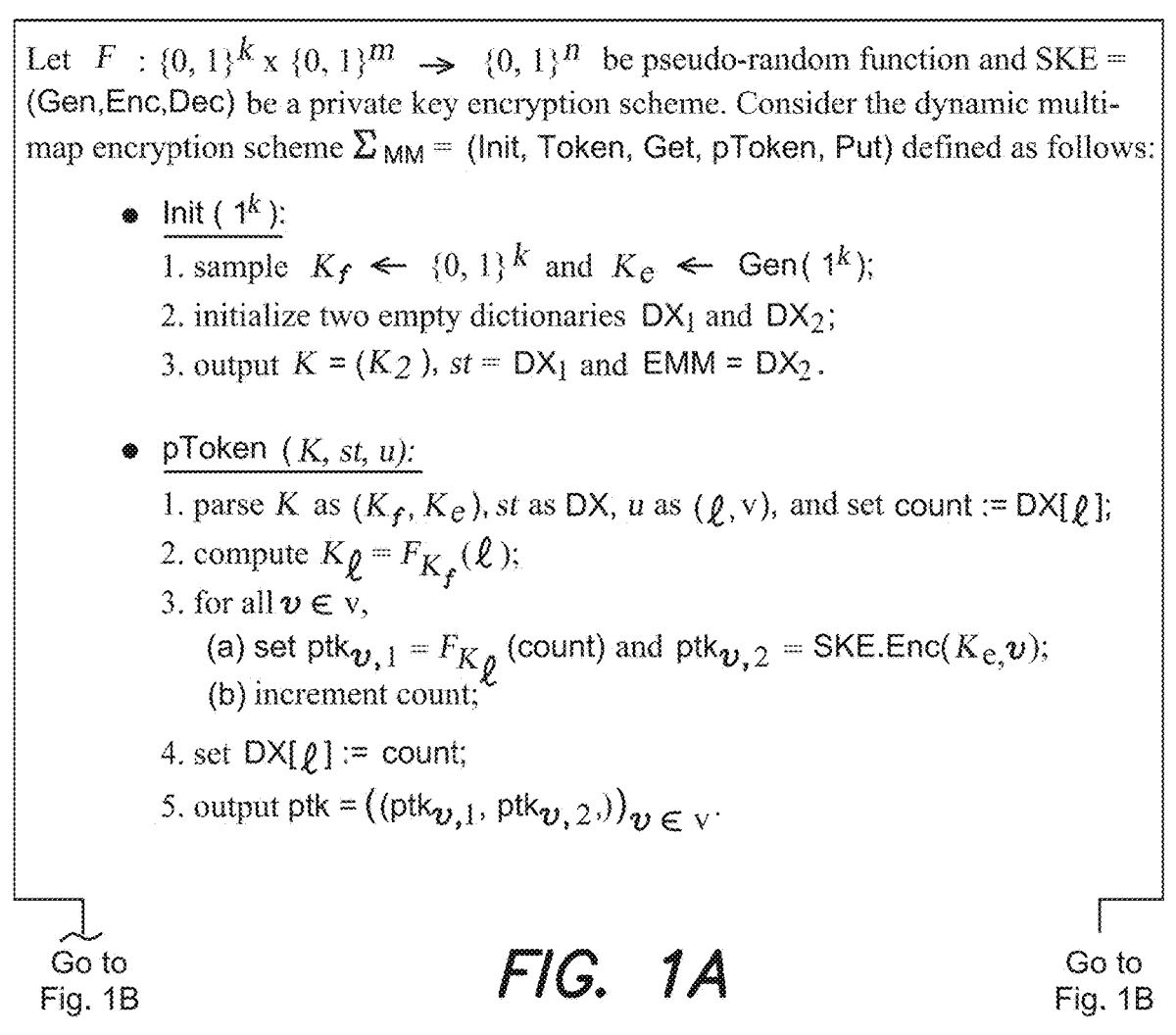

Let $F : \{0,1\}^k \times \{0,1\}^m \rightarrow \{0,1\}^n$ be pseudo-random function and SKE = (Gen,Enc,Dec) be a private key encryption scheme. Consider the dynamic multi-map encryption scheme $\Sigma_{MM}$ = (Init, Token, Get, pToken, Put) defined as follows:

- Init ( $1^k$ ):
  1. sample $K_f \leftarrow \{0,1\}^k$ and $K_e \leftarrow$ Gen( $1^k$ );
  2. initialize two empty dictionaries $DX_1$ and $DX_2$;
  3. output $K = (K_2)$, $st = DX_1$ and EMM = $DX_2$.

- pToken ( $K, st, u$ ):
  1. parse $K$ as $(K_f, K_e)$, $st$ as DX, $u$ as $(\ell, v)$, and set count := DX[ $\ell$ ];
  2. compute $K_\ell = F_{K_f}(\ell)$;
  3. for all $v \in$ v,
     (a) set $ptk_{v,1} = F_{K_\ell}$ (count) and $ptk_{v,2}$ = SKE.Enc( $K_e, v$ );
     (b) increment count;
  4. set DX[ $\ell$ ] := count;
  5. output ptk = $((ptk_{v,1}, ptk_{v,2}))_{v \in v}$.

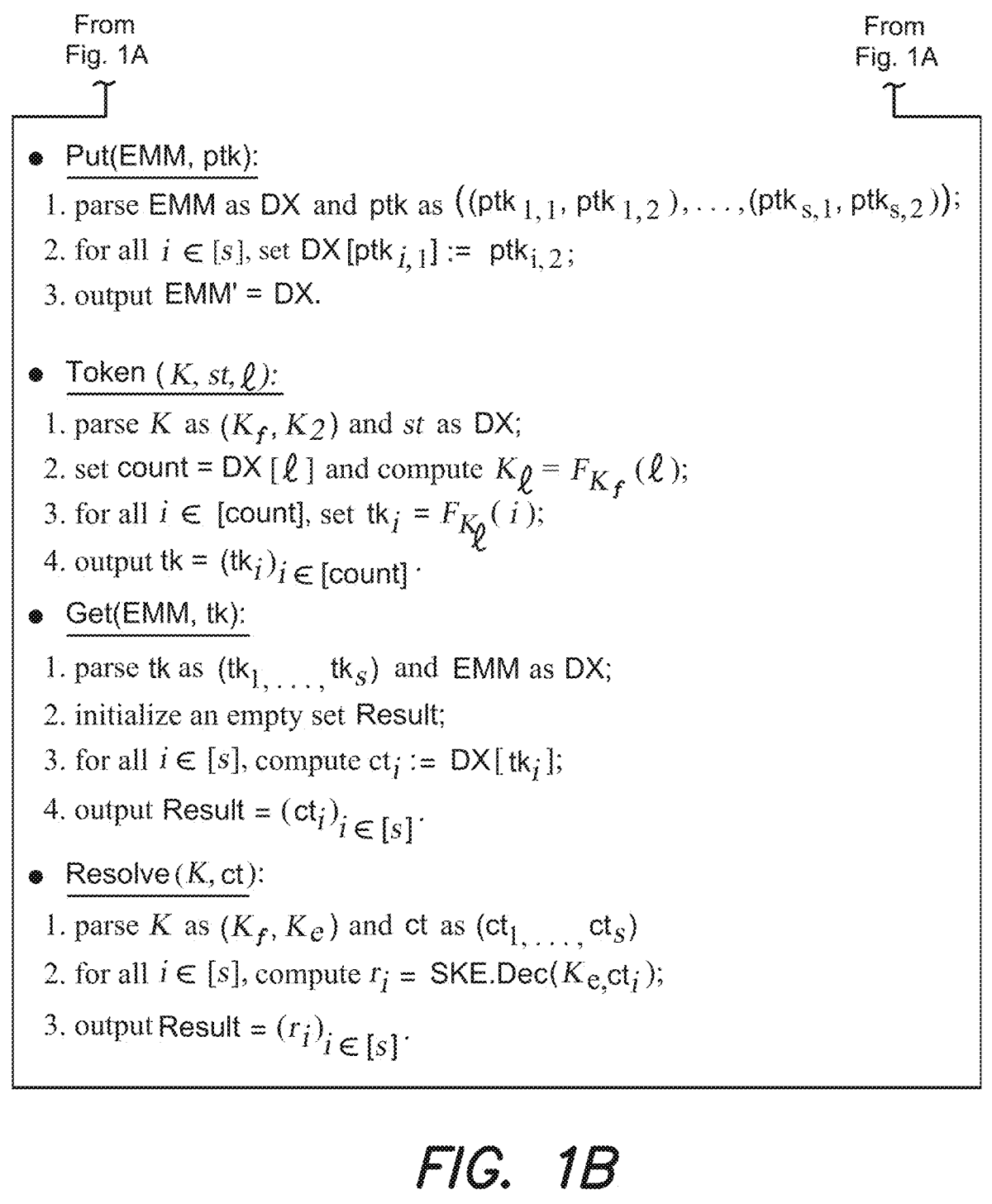

From Fig. 1A

From Fig. 1A

- Put(EMM, ptk):

1. parse EMM as DX and ptk as $((\text{ptk}_{1,1}, \text{ptk}_{1,2}), \ldots, (\text{ptk}_{s,1}, \text{ptk}_{s,2}))$;
2. for all $i \in [s]$, set $\text{DX}[\text{ptk}_{i,1}] := \text{ptk}_{i,2}$;
3. output EMM' = DX.

- Token $(K, st, \ell)$:

1. parse $K$ as $(K_f, K_2)$ and $st$ as DX;
2. set count = DX [$\ell$] and compute $K_\ell = F_{K_f}(\ell)$;
3. for all $i \in$ [count], set $\text{tk}_i = F_{K_\ell}(i)$;
4. output $\text{tk} = (\text{tk}_i)_{i \in [\text{count}]}$.

- Get(EMM, tk):

1. parse tk as $(\text{tk}_{1,\ldots,}\text{tk}_s)$ and EMM as DX;
2. initialize an empty set Result;
3. for all $i \in [s]$, compute $\text{ct}_i := \text{DX}[\text{tk}_i]$;
4. output $\text{Result} = (\text{ct}_i)_{i \in [s]}$.

- Resolve $(K, \text{ct})$:

1. parse $K$ as $(K_f, K_e)$ and ct as $(\text{ct}_{1,\ldots,}\text{ct}_s)$
2. for all $i \in [s]$, compute $r_i = \text{SKE.Dec}(K_e, \text{ct}_i)$;
3. output $\text{Result} = (r_i)_{i \in [s]}$.

FIG. 1B

Figure 2A:
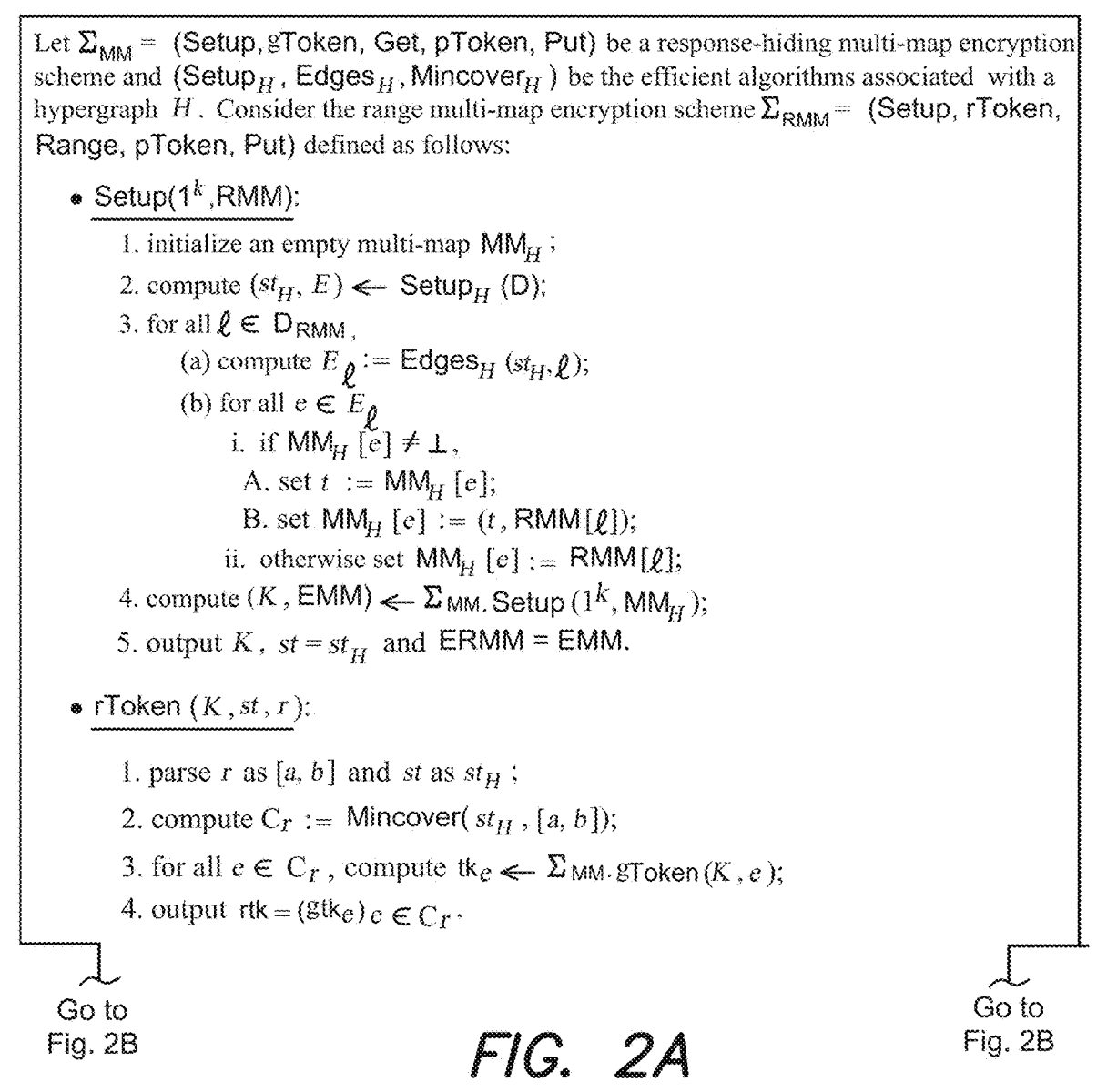

Let $\Sigma_{MM}$ = (Setup, gToken, Get, pToken, Put) be a response-hiding multi-map encryption scheme and ($\text{Setup}_H$, $\text{Edges}_H$, $\text{Mincover}_H$) be the efficient algorithms associated with a hypergraph $H$. Consider the range multi-map encryption scheme $\Sigma_{RMM}$ = (Setup, rToken, Range, pToken, Put) defined as follows:

- Setup($1^k$,RMM):
  1. initialize an empty multi-map $\text{MM}_H$ ;
  2. compute $(st_H, E) \leftarrow \text{Setup}_H$ (D);
  3. for all $\ell \in D_{RMM}$ ,
     (a) compute $E_\ell := \text{Edges}_H(st_H, \ell)$;
     (b) for all $e \in E_\ell$
        i. if $\text{MM}_H[e] \neq \perp$,
           A. set $t := \text{MM}_H[e]$;
           B. set $\text{MM}_H[e] := (t, \text{RMM}[\ell])$;
        ii. otherwise set $\text{MM}_H[e] := \text{RMM}[\ell]$;
  4. compute $(K, \text{EMM}) \leftarrow \Sigma_{MM}.\text{Setup}(1^k, \text{MM}_H)$;
  5. output $K$, $st = st_H$ and ERMM = EMM.

- rToken ($K, st, r$):
  1. parse $r$ as $[a, b]$ and $st$ as $st_H$ ;
  2. compute $C_r := \text{Mincover}(st_H, [a, b])$;
  3. for all $e \in C_r$ , compute $\text{tk}_e \leftarrow \Sigma_{MM}.\text{gToken}(K, e)$;
  4. output $\text{rtk} = (\text{gtk}_e)_{e \in C_r}$ .

Figure 2B:
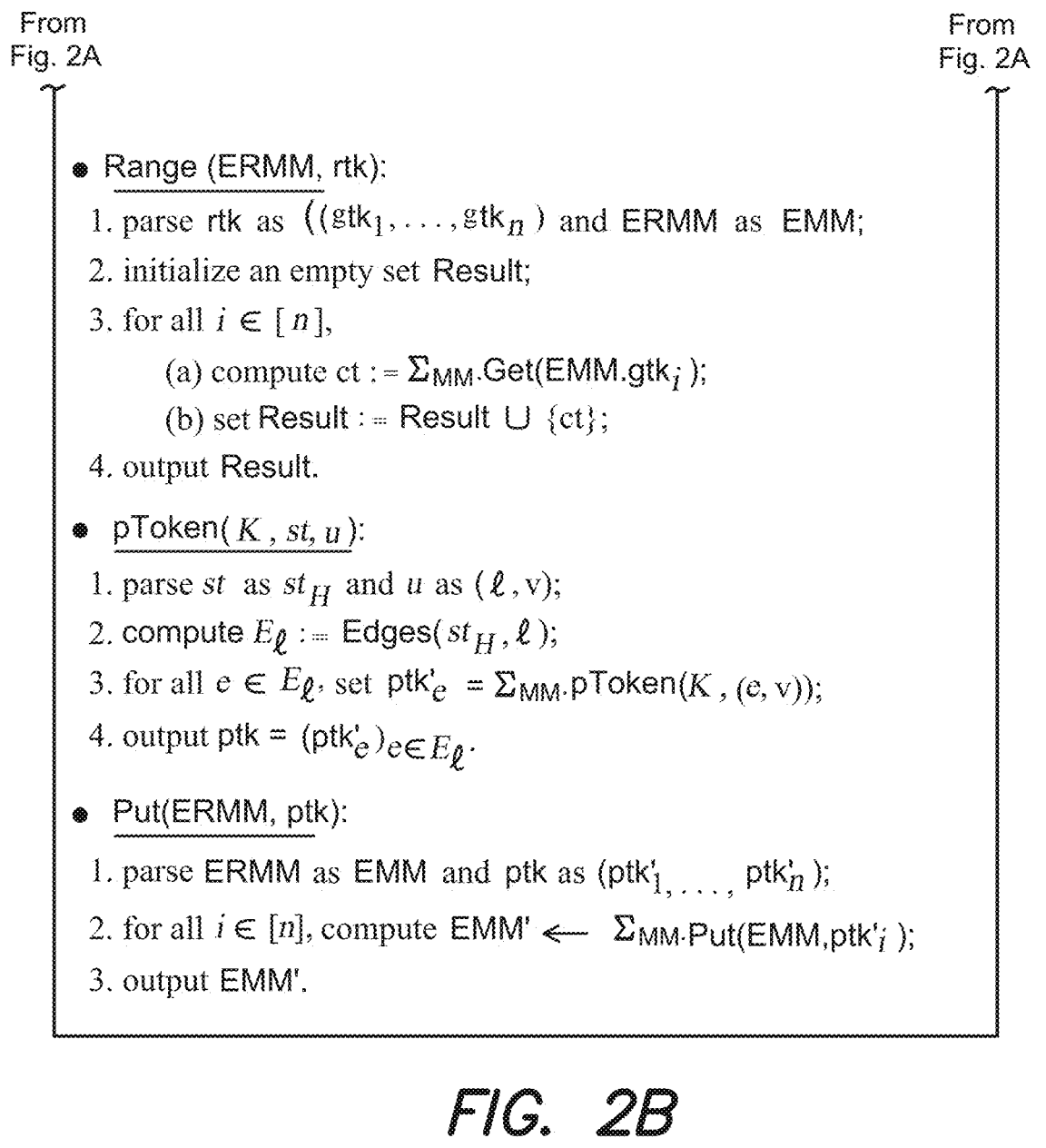

From Fig. 2A

From Fig. 2A

- Range (ERMM, rtk):

1. parse rtk as $((\text{gtk}_1, \ldots, \text{gtk}_n)$ and ERMM as EMM;
2. initialize an empty set Result;
3. for all $i \in [n]$,
   (a) compute ct := $\Sigma_{MM}$.Get(EMM.$\text{gtk}_i$);
   (b) set Result := Result $\cup$ {ct};
4. output Result.

- pToken($K$, $st$, $u$):

1. parse $st$ as $st_H$ and $u$ as $(\ell, v)$;
2. compute $E_\ell$ := Edges($st_H$, $\ell$);
3. for all $e \in E_\ell$, set $\text{ptk}'_e$ = $\Sigma_{MM}$.pToken($K$, (e, v));
4. output ptk = $(\text{ptk}'_e)_{e \in E_\ell}$.

- Put(ERMM, ptk):

1. parse ERMM as EMM and ptk as $(\text{ptk}'_1, \ldots, \text{ptk}'_n)$;
2. for all $i \in [n]$, compute EMM' $\leftarrow$ $\Sigma_{MM}$.Put(EMM,$\text{ptk}'_i$);
3. output EMM'.

FIG. 2B (a) Setup Time.

(b) Get Time.

(c) Query Time.

(d) Range Query Time.

(f) Put Time.

(g) Update Time.

(h) Delete Time.

SYSTEMS AND METHODS USING EMULATION FOR END TO END ENCRYPTION

RELATED APPLICATIONS

This application claims priority under 35 U.S.C. § 120 to and is a continuation of U.S. patent application Ser. No. 17/570,730, filed Jan. 7, 2022, entitled "SYSTEMS AND METHODS USING EMULATION FOR END TO END ENCRYPTION" now U.S. Issued U.S. Pat. No. 12,039,073, which claims priority under 35 U.S.C. § 119(e) to U.S. Provisional Patent Application No. 63/135,053, filed Jan. 8, 2021, entitled "SYSTEMS AND METHODS USING EMULATION FOR END TO END ENCRYPTION", which is incorporated by reference herein in its entirety. Application Ser. No. 17/570,730 also claims priority under 35 U.S.C. § 120 to and is a continuation in part of U.S. patent application Ser. No. 17/514,681, entitled "SYSTEMS AND METHODS USING EMULATION FOR END TO END ENCRYPTION," filed on Oct. 29, 2021, which claims priority under 35 U.S.C. § 119(e) to U.S. Provisional Patent Application No. 63/135,053, filed Jan. 8, 2021, entitled "SYSTEMS AND METHODS USING EMULATION FOR END TO END ENCRYPTION", U.S. Provisional Application No. 63/132,063, filed Dec. 30, 2020, entitled "SYSTEMS AND METHODS USING EMULATION FOR END TO END ENCRYPTION", and U.S. Provisional Application No. 63/131,487, filed Dec. 29, 2020, entitled "SYSTEMS AND METHODS USING EMULATION FOR END TO END ENCRYPTION", each of which is incorporated by reference herein in its entirety. Application Ser. No. 17/570,730 also claims priority under 35 U.S.C. § 120 to and is a continuation in part of U.S. patent application Ser. No. 17/563,425, entitled "SYSTEMS AND METHODS USING EMULATION FOR END TO END ENCRYPTION," filed on Dec. 28, 2021, which claims priority under 35 U.S.C. § 119(e) to U.S. Provisional Patent Application No. 63/135,053, filed Jan. 8, 2021, entitled "SYSTEMS AND METHODS USING EMULATION FOR END TO END ENCRYPTION", U.S. Provisional Application No. 63/132,063, filed Dec. 30, 2020, entitled "SYSTEMS AND METHODS USING EMULATION FOR END TO END ENCRYPTION", and U.S. Provisional Application No. 63/131,487, filed Dec. 29, 2020, entitled "SYSTEMS AND METHODS USING EMULATION FOR END TO END ENCRYPTION", U.S. patent application Ser. No. 17/563,425, is a continuation in part and claims priority to Ser. No. 17/514,681, entitled "SYSTEMS AND METHODS USING EMULATION FOR END TO END ENCRYPTION," filed on Oct. 29, 2021, of each of which is incorporated by reference herein in its entirety.

FEDERALLY SPONSORED RESEARCH

This invention was made with government support under Grant No. 1916335 awarded by the National Science Foundation. The government has certain rights in the invention.

BACKGROUND

Implementing end to end encryption poses many challenges in the data management and database spaces. The goal of such encryption approaches is to provide a completely secure set of data for client, irrespective of platform. In various environments, the result of such encryptions means even system hosts (e.g., cloud compute providers, database providers, etc.) are prevented from accessing underlying plaintext data even during operations performed on their systems.

SUMMARY

The inventors have realized that while many systems claim to provide end to end encryption, the actual implementation can fall far short of that goal. Further, complicated architectures and configurations limit that capability, and even expert users are challenged to take advantage of conventional encryption architectures, and especially, when the solution is applied at scale. Accordingly, the inventors have developed solutions for integrating encryption and emulation into native database formats and/or architectures. According to one embodiment, "native" database is used to describe a database that has not been designed for end to end encryption, an off the shelf database deployment, and/or a commercially available database. According to some embodiments, various encryption systems and methods employ emulation operations to enable a native database and native database functions to leverage full encryption primitives. Stated broadly, various aspects integrate emulation operations into standard database implementations, where the emulation enables native database functions to operate on entirely encrypted data.

According to one aspect, an emulation system is provided. The system comprises at least one processor operatively connected to a memory, the at least one processor when executing configured to: integrate an emulation layer into a dynamic schema database deployment; maintain the standard dynamic schema database architecture; accept and respond to database queries made on the standard dynamic schema database through the emulation layer; wherein the emulation layer is configured to: maintain data stored on the dynamic schema database so that designated data is always in an encrypted format; store encrypted state information associated with the designated data; execute queries against the designated data; and return the output to any query on the designated data to a requesting client in the encrypted format.

According to one embodiment, the system is further configured to add field and value records to a document data unit stored as a collection of documents, wherein the field and value records are encrypted at all times for storage and query execution. According to one embodiment, the system is further configured to modify field and value records in the document data unit stored as a collection of documents, wherein the field and value records are encrypted at all times for storage and query execution. According to one embodiment, the system is further configured to maintain any output from any query response in the encrypted format.

According to one embodiment, the at least one processor is configured to transform plaintext data into an encrypted multi-map and the encrypted state information. According to one embodiment, the at least one processor is configured to generate and encrypt a state dictionary that maps labels in an underlying multi-map to counters for each label as the encrypted state information. According to one embodiment, the at least one processor is configured to generate and encrypt a state multi-map, that associates labels in an underlying data multi-map to counters for each label, as the encrypted state information.

According to one embodiment, the at least one processor is configured to manage concurrent access to the encrypted state information by controlling access with transactional access to the encrypted state information or locking operations on the encrypted state information. According to one embodiment, the at least one processor is configured to retrieve the encrypted state information. According to one embodiment, the at least one processor is configured to construct at least one token as part of a query on the designated data or an update to the designated data based, at least in part, on the retrieved encrypted state information.

According to one embodiment, the at least one processor is configured to construct the at least one token comprising at least a cyphertext value and an index value. According to one embodiment, the at least one processor is configured to construct the at least one token comprising a sub token including at least a cyphertext value and index value for each counter in the encrypted state information associated with the cyphertext value being queried. According to one embodiment, the at least one processor is configured to construct a range token comprising vectors of sub tokens based, at least in part, on the retrieved encrypted state information. According to one aspect a computer implemented method for enabling end to end encryption via emulation is provided. The method comprises integrating, by at least one processor, an emulation layer into a dynamic schema database; maintaining, by the at least one processor, the native dynamic schema database architecture; accepting and responding to database queries made on the dynamic schema database through the emulation layer; maintaining, by the at least one processor, data stored on the dynamic schema database so that designated data is always in an encrypted format; storing, by the at least one processor, encrypted state information associated with the designated data; executing, by the at least one processor, queries against the designated data; and returning, by the at least one processor, the output to any query on the designated data to a requesting client in the encrypted format.

According to one embodiment, the method further comprises maintaining any output from any query response in the encrypted format. According to one embodiment, the method further comprises transforming plaintext data into an encrypted multi-map and the encrypted state information. According to one embodiment, the method further comprises generating and encrypting a state dictionary that maps labels in an underlying multi-map to counters for each label as the encrypted state information. According to one embodiment, the method further comprises generating and encrypting a state multi-map, that associates labels in an underlying data multi-map to counters for each label, as the encrypted state information.

According to one embodiment, the method further comprises managing concurrent access to the encrypted state information by controlling access with transactional access to the encrypted state information or locking operations on the encrypted state information. According to one embodiment, the method further comprises retrieving the encrypted state information. According to one embodiment, the method further comprises constructing at least one token as part of a query on the designated data or an update to the designated data based, at least in part, on the retrieved encrypted state information.

According to one embodiment, the method further comprises constructing the at least one token comprising at least a cyphertext value and an index value. According to one embodiment, the method further comprises constructing the at least one token comprising a sub token including at least a cyphertext value and index value for each counter in the encrypted state information associated with the cyphertext value being queried. According to one embodiment, the method further comprises constructing a range token comprising vectors of sub tokens based, at least in part, on the retrieved encrypted state information.

According to one aspect, an emulation system is provided. The system comprises at least one processor operatively connected to a memory, the at least one processor when executing configured to: integrate an emulation layer into a standard dynamic schema database deployment; maintain the standard dynamic schema database architecture; accept and respond to database queries made on the standard dynamic schema database through the emulation layer; wherein the emulation layer is configured to: maintain data stored on the standard dynamic schema database so that designated data is always in an encrypted format; execute queries against the designated data in the encrypted format; and return the output to any query on the designated data to a requesting client in the encrypted format.

According to one embodiment, the system is further configured to maintain any output from any query response in the encrypted format. According to one embodiment, the at least one processor is configured to transform plaintext data into an encrypted multi-map. According to one embodiment, the at least one processor is configured to construct an index on the encrypted values in the encrypted multi-map.

According to one embodiment, the at least one processor is configured to construct at least one search token as part of the query on the designated data. According to one embodiment, the at least one processor is configured to construct the at least one search token comprising at least a cyphertext value and index value. According to one embodiment, the at least one processor is configured to construct the at least one search token comprising a sub token including at least a cyphertext value and index value for each counter in a state dictionary associated with the cyphertext value being queried.

According to one embodiment, the at least one processor is configured to construct a range search token comprising vectors of sub tokens. According to one embodiment, the at least one processor is configured to generate the sub-tokens for the range search token based on counter information in a cover of the range to be searched. According to one embodiment, the at least one processor is configured to transform textual values of a plaintext database into numeric values for transformation into an encrypted multimap representation to enable end to end encryption of text search. According to one embodiment, the at least one processor is configured to: transform textual values of a plaintext database into a tree representation; and transform the tree representation into an encrypted multimap and hypergraph representation to enable end to end encryption of pattern search.

According to one aspect a computer implemented method for end to end encryption is provided. The method comprises integrating, by at least one processor, e an emulation layer into a native dynamic schema database deployment; maintaining, by the at least one processor the native dynamic schema database architecture; accepting and responding, by the at least one processor, to database queries made on the standard dynamic schema database through the emulation layer; maintaining, by the at least one processor, data stored on the native dynamic schema database so that designated data is always in an encrypted format; executing, by the at least one processor, queries against the designated data in the encrypted format; and returning, by the at least one processor, the output to any query on the designated data to a requesting client in the encrypted format.

According to one embodiment, the method further comprises maintaining, by the at least one processor, any output from any query response in the encrypted format. According to one embodiment, the method further comprises transforming plaintext data into an encrypted multi-map. According to one embodiment, the method further comprises constructing an index on the encrypted values in the encrypted multi-map. According to one embodiment, the method further comprises constructing at least one search token as part of the query on the designated data.

According to one embodiment, the method further comprises constructing the search token comprising at least a cyphertext value and index value. According to one embodiment, the method further comprises construct the search token comprising a sub token including at least a cyphertext value and index value for each counter in a state dictionary associated with the cyphertext value being queried. According to one embodiment, the method further comprises constructing a range search token comprising vectors of sub tokens.

According to one embodiment, the method further comprises generating the sub-tokens for the range search token based on counter information in a cover of the range to be searched. According to one embodiment, the method further comprises transforming textual values of a plaintext database into numeric values for transformation into an encrypted multimap representation to enable end to end encryption of text search. According to one embodiment, the method further comprises: transforming textual values of a plaintext database into a tree representation; and transforming the tree representation into an encrypted multimap and hypergraph representation to enable end to end encryption of pattern search.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIGS. 1A-B shows an example construction, according to some embodiments;

FIGS. 2A-B shows an example construction, according to some embodiments;

DETAILED DESCRIPTION

Figure 3:
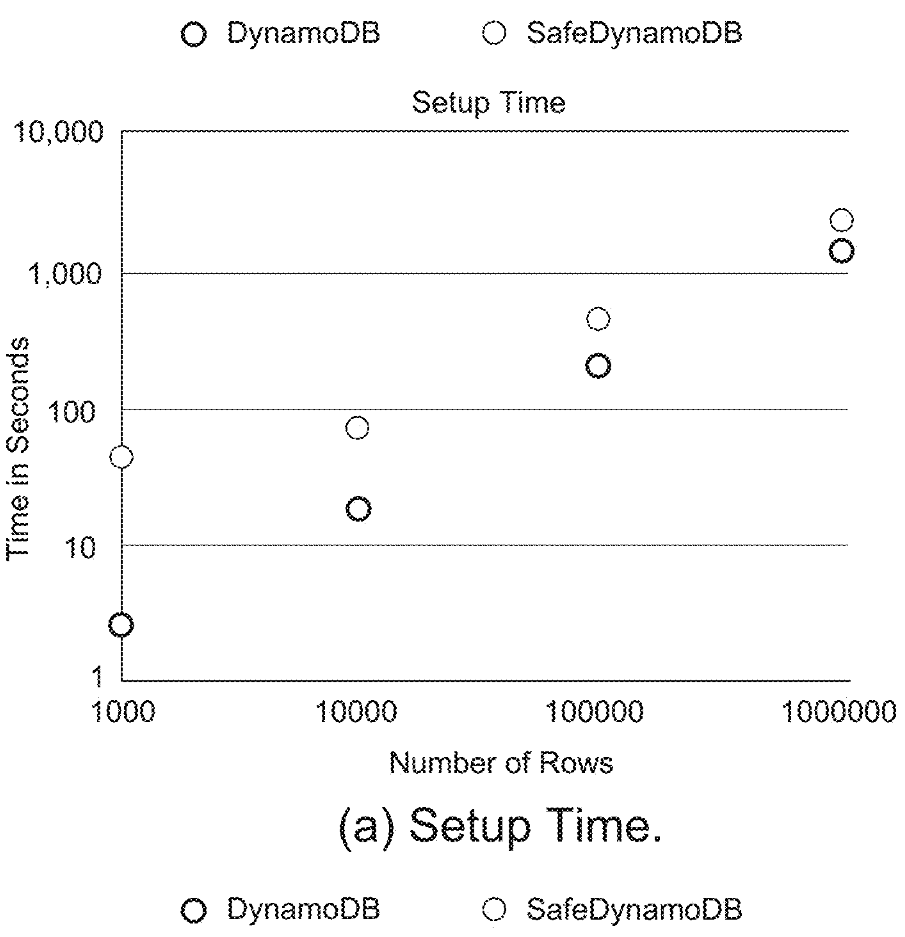
FIGS. 3-10 illustrate performance comparisons between example database implementations, according to some embodiments.
Figure 4:
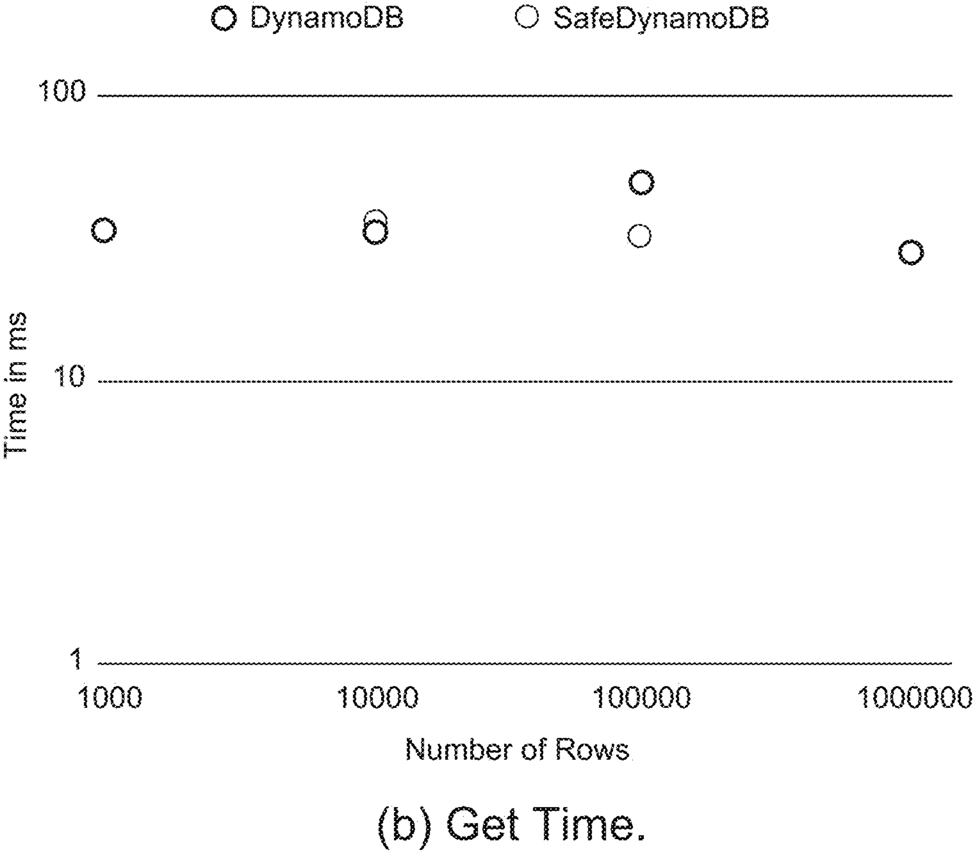
Figure 5:
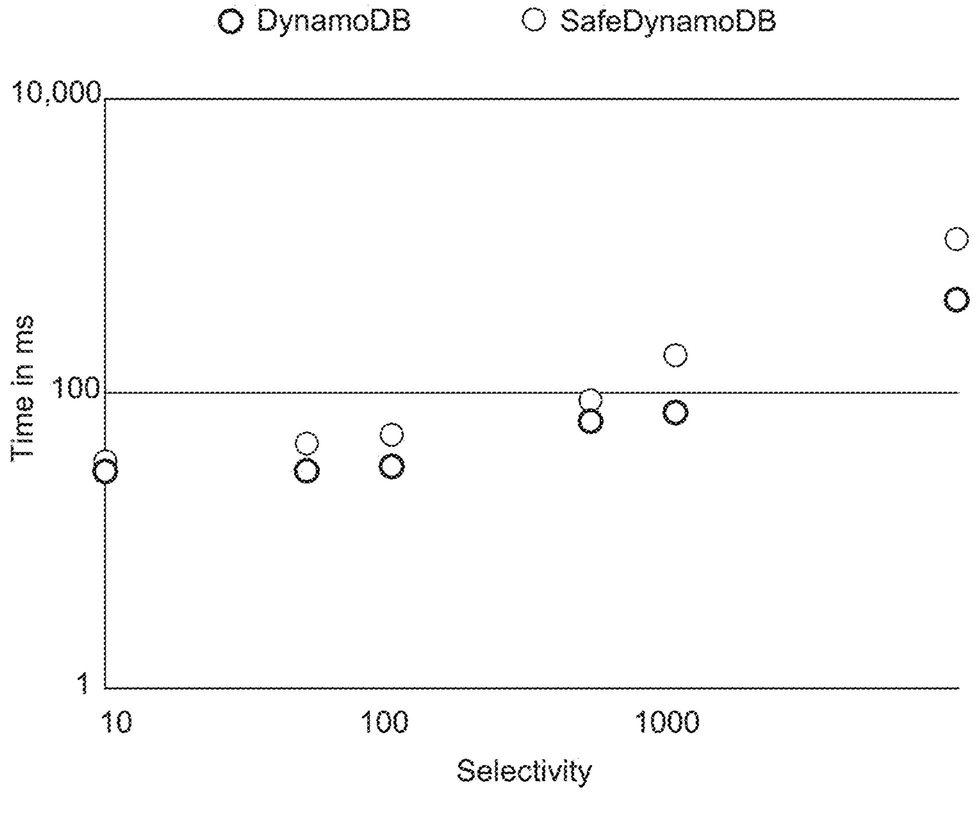
Figure 6:
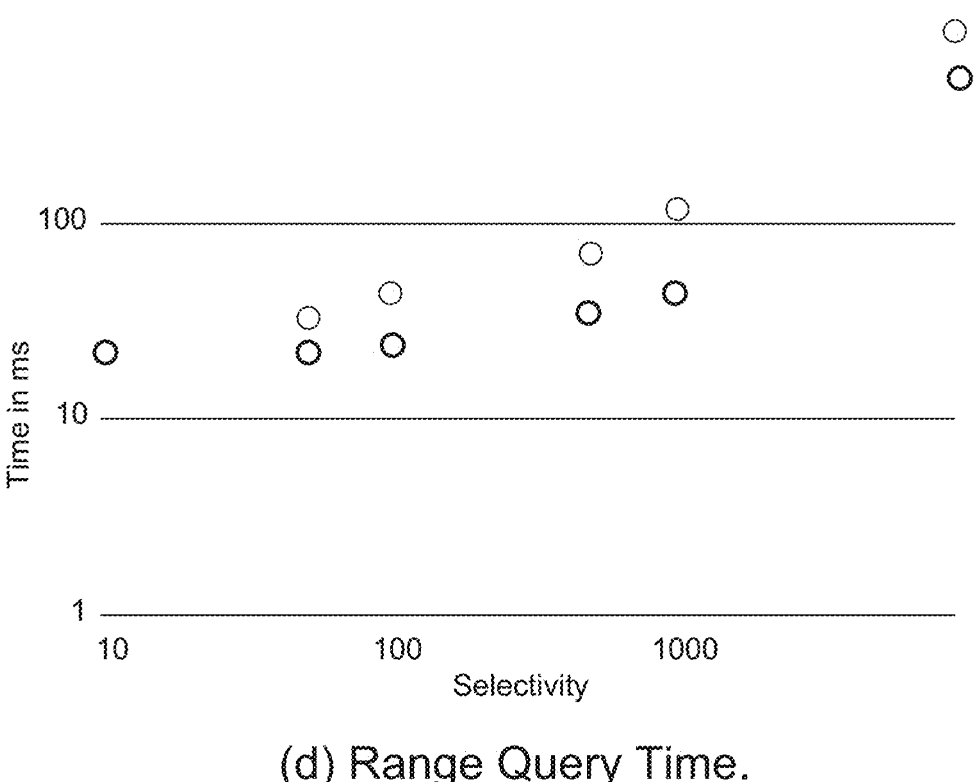
Figure 7:
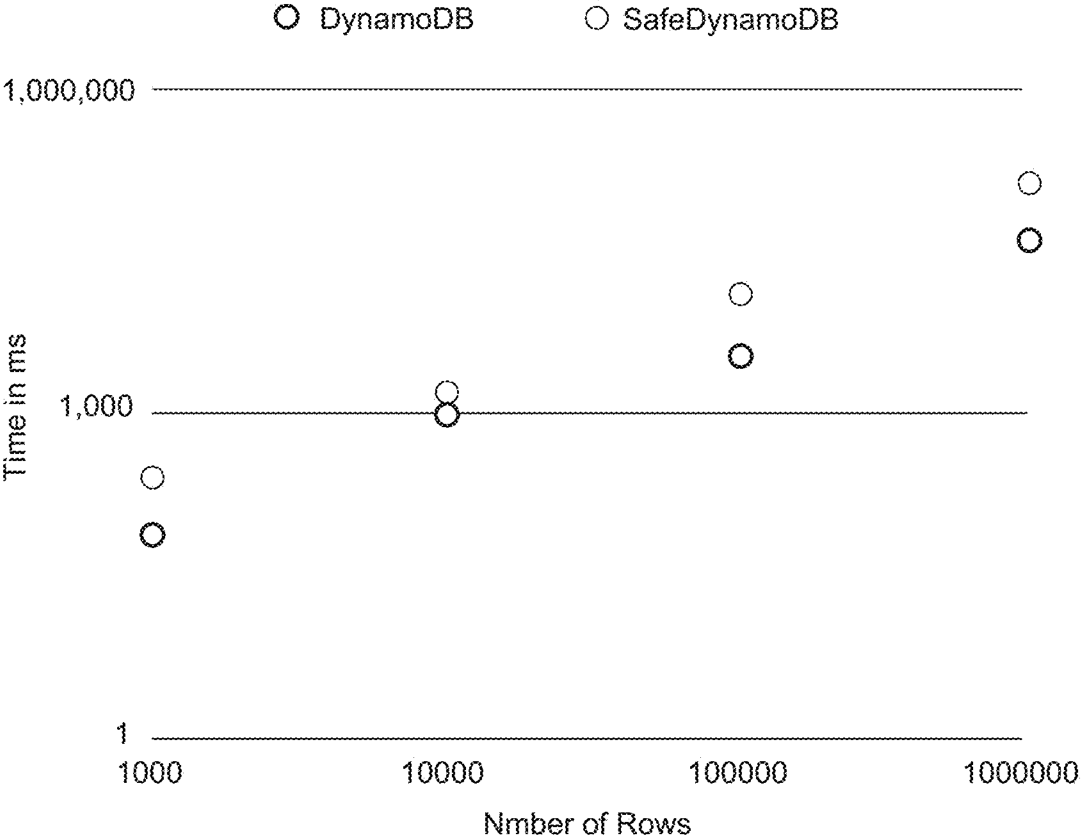
Figure 8:
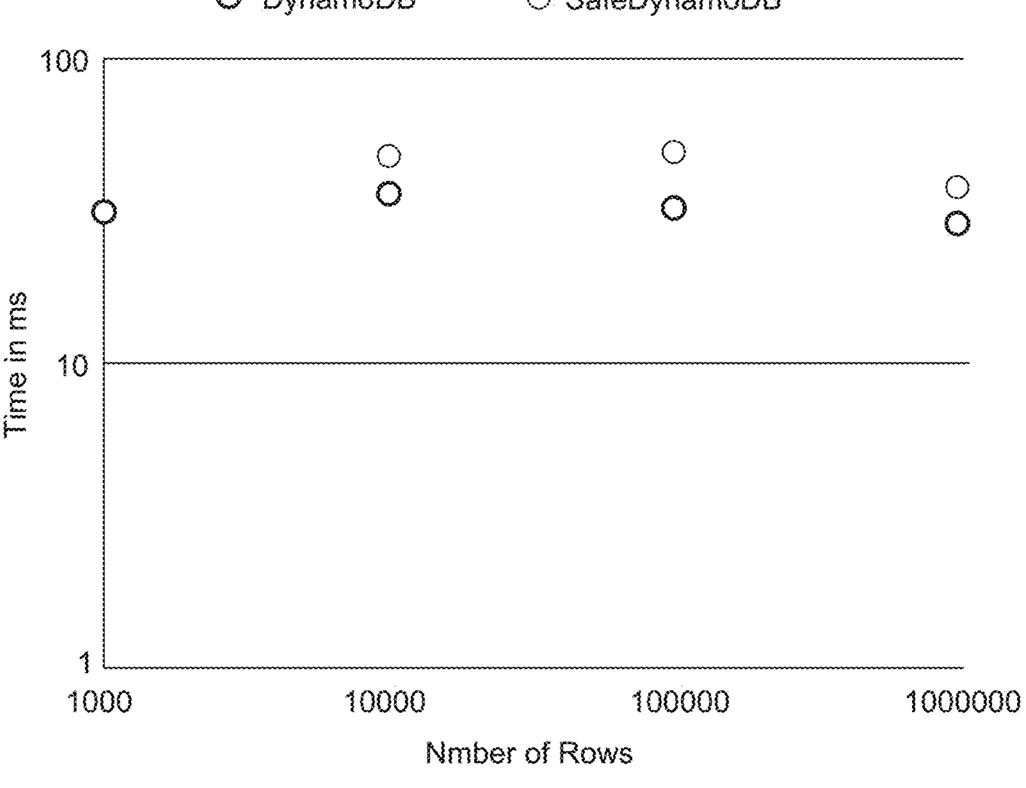
Figure 9:
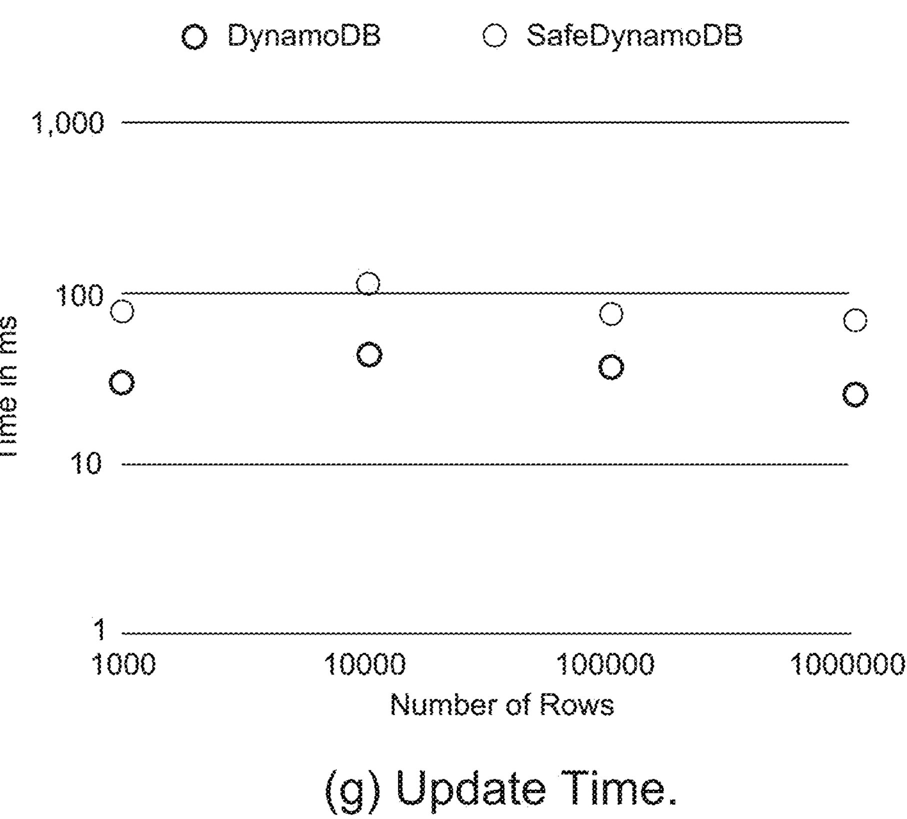
Figure 10:
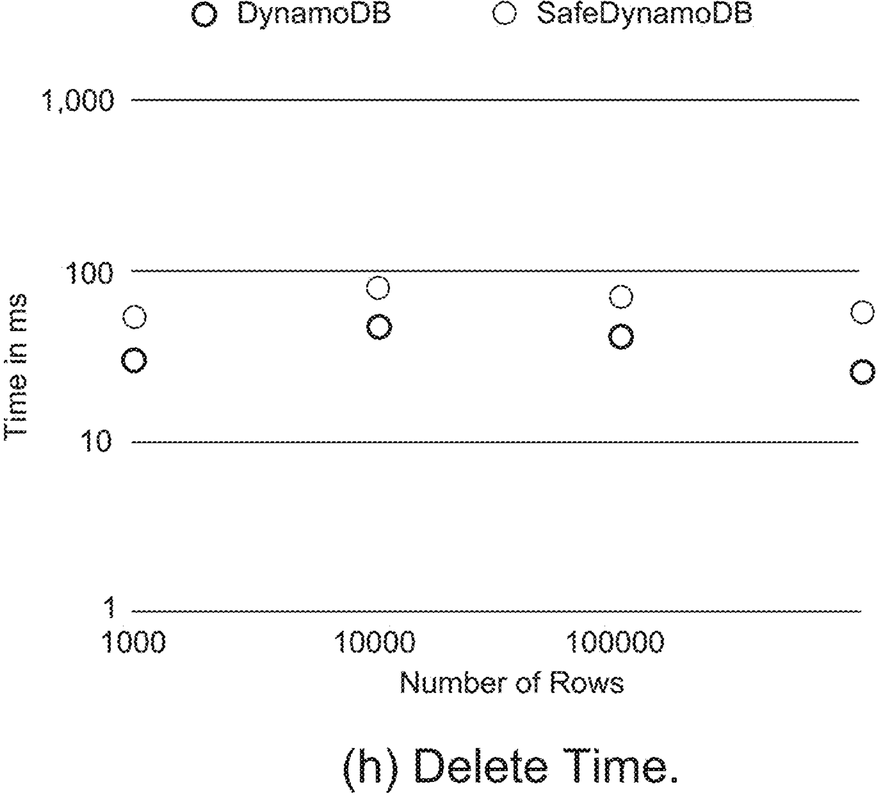

As discussed, various aspects relate to end to end encryption implementation, including hypergraph constructs to provide encryption primitives useable by native database implementation and/or operations. Various emulations techniques are discussed and/or describes to illustrate functions that enables end to end encryption systems even, for example, in native database implementation without such functionality.

Dynamic Schema (a/k/a NoSql) Database Emulation

Various technical features are described with respect to MongoDB, the well-known dynamic schema database that uses documents as organizational units of data. The features, implementation, and example described with respect to MongoDB can be implemented with other database systems, including for example, other NoSql databases (e.g., Amazon DynamoDB, Amazon DocumentDB, Elasticsearch, etc.). Further embodiments and aspects can leverage the features and operations discussed herein to implementation emulation systems operable with other database platforms and/or architectures.

SAFEMongoDB Emulator Embodiments

According to some embodiments, the nomenclature "SAFE" is used in conjunction with known databases. The reference to "SAFE" is intended to describe embodiments where end to end encryption has been implemented via emulation. Some embodiments of SAFEMongoDB provide full encryption using native, off the shelf, or standard MongoDB database deployments. Some embodiments include operations to emulate dynamic multi-map encryption schemes which are adapted to be response hiding, rather than known variants that are response revealing. Various embodiments support emulation operation using a concrete range hypergraph, named a binary partition hypergraph.

According to one embodiment, the system employs a range multi-map encryption scheme described in greater detail below with a binary partition hypergraph to enable encrypted range queries on MongoDB. To illustrate operations and explain technical features, various embodiments assume that the SAFEMongoDB client is stateful to facilitate understanding.

As discussed above, emulation uses multi-map constructs. A multi-map "MM" with capacity n is a collection of n label/tuple pairs $\{(\ell_i, v_i)_i\}_{i \leq n}$ that supports Get and Put operations. $v_i$=MM[$\ell_i$] denotes getting the tuple associated with label $l_i$ and MM[$\ell_i$]=$v_i$ to denote operation of associating the tuple $v_i$ to label $l_i$. $\mathbb{D}$ denotes the label space and $\mathbb{D}$ denotes the set of labels stored in MM. $MM^{-1}[v]$ can refer to the set of labels in MM associated with tuples that include the value v. Multi-maps are the abstract data type instantiated by an inverted index.

In the encrypted search literature multi-maps are sometimes referred to as indexes, databases or tuple-sets (T-sets). According to some embodiments, a range multi-map is defined as a multi-map RMM over a label space $\mathbb{D}$ that is a total order and that, in addition to Get and Put operations, also supports range queries: given a range $r \subseteq \mathbb{D}$, return the set of values $V=\bigcup_{\ell \in r} RMM[\ell]$. V=RMM[r] denotes getting the values associated with the range r.

In further embodiments, emulation can also employ hypergraphs. A hypergraph H=(V, E) consists of a set of n vertices $V=\{v_1, \ldots, v_n\}$ and a collection of m non-empty edges $E=\{e_1, \ldots, e_m\}$ such that, for all $i \in [m]$, $e_i \subseteq V$. The degree of a vertex $v \in V$ is the number of edges in E that contain v and is denoted by deg(v). Various embodiments include a range hypergraph defined to be a hypergraph H=(V, E) such that V is a total order and such that for all ranges $r \in R(V)$, there exists a subset $C_r \subseteq E$ such that $\cup_{e \in C_r} e=r$. The resulting set is referred to as a cover of the range r. In further example, the min-cover of a range $r \subseteq V$ is the set $$C_r = \mathrm{argmin}_{C \subseteq E}\left\{\#C: \bigcup_{e \in C} e = r\right\}.$$

To make use of a hypergraph H in various embodiments, the system executes efficient algorithms to create and manipulate it. For example, three efficient algorithms: $\mathrm{Setup}_H$, $\mathrm{Edges}_H$ and $\mathrm{Mincover}_H$ can be used to enable use of the hypergraph constructs described. $\mathrm{Setup}_H$ takes as input a vertex set V and outputs a succinct state $st_H$ and a set of edges E. The state of a hypergraph is a set of parameters that when given to the Edges and Mincover algorithms allow them to reconstruct the needed hypergraph edges and the needed min cover. While various embodiments of the concrete hypergraph are deterministic, additional implementation can include concrete instantiations that output some (including for example small perturbations) randomness that is employed for the generation of correct covers and edges.

$\mathrm{Edges}_H$ takes as input a state $st_H$ and a vertex v and outputs the subset of edges $E_v \subseteq E$ that include v. Finally, $\mathrm{Mincover}_H$ takes as input a range $r \in R(V)$ and outputs its min-cover $C_r$.

According to various embodiments, a multi-map encryption scheme encrypts a multi-map structure in such a way that the system can privately execute a Get operation. When the scheme is dynamic, the system can also perform a private Put operation. Various embodiments use the underlying encrypted multi-map for the "ERX" scheme (discussed in greater detail below). The encryption scheme can be modified and augmented to be response-hiding as opposed to being response-revealing.

According to some embodiments, response-hiding can be achieved by not providing the server with a search sub-token that would allow the server to decrypt a response. This example modifies how the search token works in the encryption scheme. In further example, response hiding can be achieved with additional modification based on use of a multi-map-wide encryption key for all the tuple values, instead of prior approaches that generate a label-derived key to encrypt every tuple value.

According to some embodiments, full encryption and end to end operation employs response-hiding architectures to prevent the server from being able to understand the values generated in data retrieval and/or query execution. Further embodiments provide forward-privacy guarantees by reworking how the Token and Get algorithms (of prior approaches) work. For example, shown in the Token algorithm at line three (FIG. 1) is a modification from prior approaches to enable response-hiding operation. In another example, in the Get operation, the algorithm does not employ sub-tokens as would be done in prior works.

An example construction is detailed in FIGS. 1A-B. The Figures describe a pseudo-random function, private key encryption scheme, and dynamic multi-map encryption scheme $\Sigma_{MM}$.

Example Framework for Encrypting Range Multi-Maps

According to another embodiment, ERX includes a range multi-map functionality that makes black-box use of a dynamic response-hiding multi-map encryption scheme $\Sigma_{MM}$=(Setup, gToken, Get, pToken, Put) and of a range hypergraph construction H equipped with efficient algorithms $\mathrm{Setup}_H$, $\mathrm{Edges}_H$ and $\mathrm{Mincover}_H$. An example construction and example details of the scheme are illustrated in FIGS. 2A-B. The following descriptions of various embodiments provides an overview of the algorithms.

Setup. According to one embodiment, the Setup algorithm takes as input a security parameter k and a range multi-map RMM. The algorithm uses $\mathrm{Setup}_H$ to construct a range hypergraph H=($\mathbb{D}$, E) over the label space $\mathbb{D}$ of RMM. Specifically, it runs $\mathrm{Setup}_H$ on $\mathbb{D}$ to compute a set of edges $E \subseteq P(\mathbb{D})$ and a succinct representation $st_H$ of H. Setup then constructs a multi-map $MM_H$ that maps each edge (identifier) $e \in E$ to the values associated with the labels in e. In various embodiments and description, this multi-map is referred to as the hyper multi-map. That is, for all $e \in E$, $MM_H$ maps the edge e to a tuple of values $t_e$ defined as:

$$t_e = (RMM[\ell])_{\ell \in \mathbb{D}_{RMM} \cap e}.$$

Based on the implementation described above, a plaintext range query r can now be answered by first finding the minimum cover $C_r$ and querying $MM_H$ on the identifiers of the edges $e \in C_r$. It then encrypts $MM_H$ with $\Sigma_{MM}$ and returns the resulting key K as its own key and the resulting encrypted multi-map EMM as the encrypted range multi-map. More precisely, it outputs K, $st=st_H$ and ERMM=EMM.

Example Range token. According to one embodiment, the rToken algorithm takes as input a secret key K, a state st and a range query r=[a, b]. It uses $\mathrm{Mincover}_H$ to compute the minimum cover $C_r$ of the range query and, for each edge $e \in C_r$, computes a get token $gtk_e$ using $\Sigma_{MM}$.gToken. It then outputs a range token $rtk=(gtk_e)_{e \in C_r}$.

Example Ranges. According to one embodiment, the Range algorithm takes as input an encrypted range multi-map ERMM=EMM and a range token rtk parsed as $(tk_e)_{e \in C_r}$. It then uses $\Sigma_{MM}$.Get to query EMM on each of the sub-tokens in rtk and outputs the union of the results.

Example Put token. The pToken algorithm takes as input a secret key K, a state st and a new label/tuple pair (l, v). It first uses $\mathrm{Edges}_H$ to find the set of edges $E_l$ in H that contain l. For all $e \in E_l$, it uses $\Sigma_{MM}$.pToken to create a put token $$ptk'_e.$$

It then outputs a put token $$ptk = (ptk'_e)_{e \in E_\ell}.$$

Example Put. The Put algorithm takes as input the encrypted range multi-map ERMM=EMM and a put token ptk. It first parses the put token as a tuple of sub-tokens $$(ptk'_e)_{e \in E_\ell}.$$

It then uses $\Sigma_{MM}$.Put to apply each of the sub-tokens to the encrypted multi-map. Finally, it outputs the updated encrypted multi-map.

Binary Partition Hypergraph Examples

According to various embodiments, described are implementation examples, features, and functions of a range hypergraph instantiation used in various dynamic schema emulations (e.g., SAFEMongoDB, SAFEElastic and SAFE-DynamoDB).

According to one embodiment, the binary partition hypergraph is defined as $H_{BP}=(\mathbb{D}, B(\mathbb{D}))$, where $B(\mathbb{D})$ is a collection of subset of $\mathbb{D}$ defined as follows. Let $e_{a,w}$ be the set of elements {a, a+1, . . . , a+w−1}; that is, the range of width w starting at a. $B(\mathbb{D})$ is then defined as the collection:

$$\mathcal{B}(\mathbb{D}) = \left\{ e_{w,(k-1)w+1} \subseteq \mathbb{D} : w \in \{2^i\}_{i=1}^{\log d}, k \in \{1, \ldots, \frac{d}{w}\} \right\},$$

where $d=\#\mathbb{D}$.

For an example of a concrete hypergraph instantiation, there are further embodiments that can implement additional parameters to reduce the number of edges composing $B(\mathbb{D})$. In one example, a first parameter is the sparsity factor and a second parameter that can be used is a query length factor. They are defined as follows.

Example Sparsity factor. According to one embodiment, this parameter controls the number of levels that are going to be created in the binary partition hypergraph. In default setting, there are log d levels that are going to be created where d is the size of the domain. The rationale behind this factor is that data is usually sparse which means that the created edges are going to hold fewer elements. For SAFE implementations (e.g., fully encrypted), defined are three levels of sparsity: (1) low, (2) medium, and (3) high. For low sparsity, half the levels are kept; for medium sparsity, a quarter of levels are kept while for high sparsity, one eighth of the levels are kept. If we denote by δ the sparsity factor, then the collection of edges becomes equal to:

$$\mathcal{B}(\mathbb{D}) = \left\{ e_{w,(k-1)w+1} \subseteq \mathbb{D} : w \in \left\{2^{\lfloor \frac{i}{\delta} \rfloor + 1}\right\}_{i=1}^{\log d}, k \in \{1, \ldots, \frac{d}{w}\} \right\},$$

According to various embodiments, the formula used to define the different levels of sparsity is not unique and other variations are possible. For example, the system can change the sparsity levels to depend on the data distribution itself if the data is already known or its distribution is known. These variations can lead to the generation of a lower number of levels without increasing the communication and computation complexity. Typically, the more levels the fewer false positives are retrieved in the encrypted range scheme. However, it is possible to reduce the number of levels without increasing the number of false positives. For example, this can be done when the data distribution is known.

Example Query length. This factor represents the width of range queries that a client is going to query. If the client is aware of the possible range queries, then the system can reduce the number of levels generated beyond what was obtained with the sparsity factor. More precisely, if the client already knows that all of its queries are going to have a width between α and β, then the number of levels can be further reduced and the set of edges is equal to:

$$B(\mathbb{D}) = \left\{ e_{\omega,(k-1)\omega+1} \subseteq \mathbb{D} : \omega \in \left\{2^{\lfloor \frac{i}{\delta} \rfloor + 1}\right\}_{i=\log\alpha}^{\log\beta}, k \in \left\{1, \ldots, \frac{d}{\omega}\right\} \right\},$$

Example Cover. Given a range r, the minimum cover algorithm, $\text{Mincover}_H$, will identify the set of edges that cover the r. In our case, introduced is a new notion of cover which does not necessarily lead to the minimum cover and by doing so introduces some false positives. In particular, the cover algorithm works as follows: given a range r=[a, b], it identifies the width w of the range which has to be a multiple of 2 such that $w=2^\rho$ and $$2^{\rho-1} \leq a - b \leq 2^\rho.$$

If the window is equal to the domain size d, then the cover is composed of a single edge $e_{d,1}$. Otherwise, the cover is composed of two edges $e_{a1,w}$ and $e_{a2,w}$ where $$a1=(\lambda-1)\cdot w \text{ and } a2=\lambda\cdot w,$$

where $$\lambda = \left\lfloor \frac{a}{w} \right\rfloor + 1.$$

In some embodiments, the cover algorithm can be modified to reduce the number of false positives retrieved by using a different cover. In one example, knowledge of the data a-priori enables further optimization.

Example Computing edges. Given a new numerical value v, the $\text{Edges}_H$ algorithm identifies all edges e such that v∈e. In this case, the set of edges E that contain v is computed as follows $$E(v) = \left\{ e_{\lfloor \frac{v}{\omega} \rfloor + 1, \omega} \subseteq \mathbb{D} : w \in \left\{2^{\lfloor \frac{i}{\delta} \rfloor + 1}\right\}_{i=\log\alpha}^{\log\beta} \right\}.$$

MongoDB Implementation Examples

As an example, consider a document that has two textual fields and a single numerical field. The description shows how the document is encrypted (in part) and stored in an unmodified MongoDB database. Finally, described is how the encrypted document is queried. Note that, for simplicity, the system assumes the client is stateful. Consider the following document

```
{
  " name " :  " Bob ", " age "  : 33 ,
  " ssn " : " 999 -99 -9999 "
}
```

The system is configured to encrypt and search on the age and ssn fields. In particular, for age, the system supports range queries whereas for ssn the system supports exact (point) queries. Encrypting field names. The first step in the encryption process is to encrypt the names of the fields to protect. The field names can be encrypted either probabilistically (e.g., using AES in CTR mode) or deterministically (e.g., using AES in CTR mode with a synthetic initialization vector). In various embodiments, there are different ways to encrypt deterministically.

Example index field. To support emulation, the system is configured to create a new field called index which is going to hold cryptographic information related to the encrypted data structure being emulated. The data type of index is an array. At this stage the document will look like

```
{
  " name " :  " Bob ", " iwqP96R3PkoZuTh "  : 33 ,
  " 4fY1sAfj8QBMLW =" : " 999 -99 -9999 ",
  "_ index_ " : Array
}
```

here "name" is left unencrypted and "age" and "ssn" are encrypted as "iwqP96R3PkoZuTh" and "4fY1sAfj8QBMLW=", respectively. The encrypted text is provided as an example and has no meaning beyond illustration.

Encrypting the ssn value. To encrypt the ssn value, various embodiments, (e.g., SAFEMongoDB) use the Put algorithm of the dynamic multi-map encryption scheme described above as follows.

The label/value pair is (999-99-9999, 999-99-9999)—compute $\Sigma_{MM}$·pToken (K, st, (999-99-9999, 999-99-9999). The output of this step is a put token ptk=($ptk_1$, $ptk_2$) which (for example) has the form (UC+ZUPgSzIRZF, 28ObIHYql0WdG). The first element of this pair, $ptk_1$=UC+ZUPgSzlRZF, is stored in the index field of the document while the second element, $ptk_2$=28ObIHYql0WdG, is stored as the new value of the ssn field. Now, the document looks like:

```
{
  "name":  "Bob", "iwqP96R3PkoZuTh":33,
  "4fY1sAfj8QBMLW=":"28OblHYql0WdG",
  "_index_": [UC+ZUPgSzlRZF]
}
```

In this example, the state is updated; specifically, the counter associated to 999-99-999 is incremented by one. Also, $ptk_1$ is a PRF (pseudo random function) evaluation while $ptk_2$ is a ciphertext.

Encrypting the age value. To encrypt the age value, various embodiments (e.g., SAFEMongoDB) uses ERX with the binary partition hypergraph. The system can allow the client to specify the query width, the sparsity factor, the domain size, and the start of the domain but the default parameters are: (1) a domain size of $2^{32}-1$; (2) a sparsity factor of 4; (3) any query width; and (4) a domain starting at 0.

To encrypt the value 33, generate a put token for the pair (33, 33) by computing $\Sigma_{RMM}$·pToken (K, (33, 33)) which outputs a token ptk=($tk_{1,1}$, $tk_{1,2}$), . . . , ($tk_{q,1}$, $tk_{q,2}$), where q is the number of levels for the binary partition hypergraph which is set to 8 by default. Recall that, for all $1 \le i \le q$, $ptk_{i,1}$ and $ptk_{i,2}$ are PRF evaluations and ciphertexts, respectively. Store all the $ptk_{i,1}$'s in the index field and a single $tk_{j,2}$ in the age field, where j is arbitrarily chosen from between 1 and q. The document now looks like:

```
{
  "name":"Bob",
  "iwqP96R3PkoZuTh" : "vs2zAXsLPAClO5tZ1" ,
  "4fY1sAfj8QBMLW=" : "28OblHYql0WdG",
  "_index_":[UC+ZUPgSzlRZF, Yqvk6w+9cgHfq,
    m4ddvq9C42tuZ, kAcDpILUwo4c, /hTGYISjq8v, 5fn3glqFwpw,
    e+LDTwFeDwD, LKhlgrGhvH2, DXhkjegZsud]
}
```

As above, state is also updated. However, instead of updating a single entry, update q entries (i.e., the number of levels in the binary partition hypergraph). More precisely, these entries are the edge identifiers of the edges computed in line 3 of the pToken algorithm in FIG. 2.

Storing the encrypted document. The age and ssn fields and their corresponding values are now encrypted. These operations can be done at the client—the next step is to store this new encrypted document in a MongoDB database. This can be done by using the insertOne or insertMany calls of the mongo-java-driver or other database insert/create functions available in standard MongoDB deployments.

Unlike a plaintext/regular MongoDB database, various embodiments are configured to create a single index structure; specifically, on the index field. In further embodiments, the encryption process does not impact the unencrypted fields like name and all plaintext operations can be performed as before.

Querying ssn. Assume that the client would like to retrieve all documents such that ssn is equal to 999-99-9999. To do this, the client computes $\Sigma_{MM}$·Token (K, 999-99-999) which generates a search token tk. Note that this token is itself composed of t sub-tokens, where t is the counter associated to 999-99-9999 in the state st. As an example, if the counter for 999-99-9999 is equal to 2, then there are 2 documents that contain this social security number and there are t=2 sub-tokens in tk. In our example, the token tk=($tk_1$, $tk_2$) would be equal to tk=(UC+ZUPgSzlRZF, mBsjrZlqNnceT). Then construct a disjunction of MongoDB equality filters on the index field:

```
Filters.or ([
Filters. eq ("_index_",UC+ZUPgSzlRZF),
Filters. eq ("_index_", mBsjrZlqNnceT)
])
```

This filter is then executed using a find method. Various embodiments can be configured to implement stateless operation, however, there are several additional parameters that come into play when the client is stateless and the state is stored in the MongoDB instance.

According to some embodiments, once the documents are retrieved, they are decrypted (e.g., at the client side). According to one embodiment, the index field is not retrieved since it only contains data used for the search operation. This helps to reduce the overall communication complexity.

Querying age. Assume that the client would like to retrieve all documents such that age is greater than or equal to 30. The client computes $\Sigma_{RMM}$·rToken (K, [30, $2^{32}-1$]) algorithm to generate a search token tk=(tk1, tk2), where $tk_1$ and $tk_2$ are vectors of sub-tokens $tk_1$=($tk_{1,1}$, . . . , $tk_{1,a}$) and $tk_2$=($tk_{1,1}$, . . . , $tk_{1,b}$) and a and b denote the counter information of the edges in the cover (see FIG. 2). In the following, consider the case a=b=2 and, for our example, $tk_1$=(Yqvk6w+9cgHfq, ZUFHuvhZKD8uH) and $$tk_2 = (oLZJYzLMSyptbL, OXBI5B128MAuD).$$

As above, build a filter composed of a disjunction of MongoDB equality filters on the index field:

Filters, or([
Filters. eq("_index_", Yqvk6 w+9cgHfq),
Filters. eq("_index_", ZUFHuvhZKD8uH),
Filters. eq("_index_", oLZJYzLMSyptbL),
Filters. eq("_index_", OXBI5B128MAuD)
])

This filter is then executed using a find method. Various embodiments can be configured to implement stateless operation, however, there are several additional parameters that come into play when the client is stateless and the state is stored in the MongoDB instance.

Once the documents are retrieved, it is possible that there are some false positives in the sense that the age field is not going to be in the range [30, $2^{32}-1$]. According to some embodiments, the client is configured to remove false positive return values before outputting the final result. In various examples, it would have been more efficient to specify a custom domain size (e.g., $2^7-1$) instead of $2^{32}-1$) for the field age, as it will lead to a smaller number of levels. For simplicity, the example employs the default settings.

Example Mappings from Native Operation to Encrypted Search

According to some embodiments, a "Safe" client can be configured to accept native plaintext search queries. The client can be configured to map native operations into encrypted search functions. The following include examples of mappings between MongoDB's plaintext/native operations and SafeMongoDB's encrypted operations. In the following examples, the description is written in Java with the syntax of MongoDB's Java Driver to illustrate, but other examples include similar mappings for other languages such as C#, C, C++, Go, etc. To facilitate understanding a subset of the query operators available in MongoDB are described with their encrypted search mappings including: eq, gt, regex and text. Other embodiments include additional operation mappings including, for example, gte, lte, lt, not, ne etc. Moreover, the snippets below are provided to illustrate and do not necessarily describe the entire query execution.

Equality filter (eq operator):

Plaintext:

FindIterable<Document> documents=collection.find(eq (fieldName, query))

Encrypted:

SafeFindIterable<Document> documents=safeCollection.find(eq(safeMongoClient, fieldName, query))

Range filter (gt operator):

Plaintext:

FindIterable<Document> documents=collection.find(gt (fieldName, value))

Encrypted:

SafeFindIterable<Document> documents=safeCollection.find(gt(safeMongoClient, fieldName, value))

Regular expression filter (regex operator)

Plaintext:

FindIterable<Document> documents=collection.find (regex(fieldName, pattern))

Encrypted:

SafeFindIterable<Document> documents=safeCollection.find(regex (safeMongoClient, fieldName, pattern))

Text filter (text operator)

Plaintext:

FindIterable<Document> documents=collection.find(text (textValue)).

Encrypted:

SafeFindIterable<Document> documents=safeCollection.find(text(safeMongoClient, textValue))

In various embodiments, the architecture of the known MongoDB database is used to support fully encrypted operation. For example, MongoDB makes use of collections and documents. Documents consist of key-value pairs which are the basic unit of data in MongoDB. Collections contain sets of documents and are loigcal orginazations of documents and can be accessed by name. In some examples, a SafeMongoDB server is configured to stored encrytped values per the described encryption schemes in documents and collections, and respond to queries against the encrypted data, returning encrypted results.

Example Implementation and Experiments

According to some embodiments, the system has been implemented to demonstrate the feasibility of the technology in several ways by building and benchmarking for example: a fully encrypted search engine based on Elasticsearch; and an end to end encrypted NoSQL database (which can be based on Amazon's DynamoDB, MongoDB, etc.).

Encrypted NoSQL and Search Engine Embodiments

For example, various embodiments can provide for any one or more or any combination of the following objectives:

Objective: design and build an end to end encrypted NoSQL database based on Amazon's DynamoDB.

Objective: design and build an end to end encrypted search engine based on Elasticsearch Various embodiments implement new cryptographic schemes to handle the various queries supported by DynamoDB and Elastic Search and integrate them for execution on these databases. Example prototypes include "SAFEDynamoDB" and "SAFEElastic," respectively. SAFEDynamoDB embodiments are currently configured for single keyword queries, multi-keyword queries, and range queries. Embodiments of SAFEElastic are currently configured for single keyword queries, multi-keyword (boolean) queries, range queries, substring queries, prefix queries and suffix queries. To the inventors' knowledge, the cryptographic techniques introduced to handle range, substring, suffix and prefix queries are novel and, as far as known, represent the state of the art in encryption and emulation research.

Example empirical evaluations are promising and are shown below. For example, FIGS. 3-10 illustrates the results of an evaluation of a SAFEDynamoDB embodiment. For example, the setup time, takes less than 38 minutes to store 1 million rows with a multiplicative factor of 1.68 over plaintext data. For single keyword and range queries, various embodiments of SAFEDynamoDB are shown to be 2.6× and 2.8× slower than plaintext DynamoDB, respectively. For update operations, depending on whether the update is an addition, a modification or a delete, various embodiments of SAFEDynamoDB are shown to be 1.5× to 2.6× slower than plaintext DynamoDB.

FIGS. 3-10 show performance comparisons between AWS DynamoDB and SAFEDynamoDB.

NOSQL Database Embodiments

Architecture Overview Examples

Elasticsearch is a widely used distributed full-text search engine. Through an HTTP web interface, a client can perform very expressive search queries such as range, boolean, suffix, prefix or pattern (regex-like) queries. Various embodiments provide a design and implementation of an end to end encrypted variant of Elasticsearch. Further examples described herein provide the same encrypted operation with no modification to the search engine backend. These embodiments yield a novel software development kit (SDK) for enabling end to end encryption.

Similar to Elasticsearch's REST high-level API, various embodiments deliver a high-level REST API that resides on the app/client side and that is responsible for rewriting the queries, encrypting them, and decrypting the result set. To facilitate understanding, described are elements from a prototype example of SAFEElastic, and further implementation details with respect to some technical objectives. Various embodiments can implement any one or more or any combination of the following objectives:

(obj 1): Improving an encryption emulator. As a first step, the objective aims to reduce the storage overhead due to the underlying emulation scheme.

Although some current prototypes have a high storage footprint in some scenarios, further refinement can reduce the size. According to one embodiment, various embodiments identify and categorize settings that contribute to size, and then implement a specific emulator that reduces this overhead. Various embodiments yield different trade-offs between storage complexity and communication complexity; and thus, various embodiments are provided based on a flexible emulator that can trade storage for communication and vice-versa on-demand depending on the user's needs and scenarios.

In yet other embodiments, the focus or technical objective can include improving the efficiency of the emulator with respect to the number of round trips and the communication complexity. In some embodiments, the emulators can be parallelized. This stems from the fact that the system is configured to transform a query into a series of smaller encrypted queries that can be, in many settings, executed in parallel. The result is that communication overhead of such emulators can be written as a function of the number of parallel executions a client can simultaneously perform. The more parallel executions a client can make, the smaller the latency is going to be. According to various embodiments, this objective demonstrates that the technology can trade efficiency for a more powerful client machine. This aspect demonstrates a new trade-off that has not been identified in encrypted search literature, and thus functionality unavailable in many conventional approaches.

(obj 2): Generalizing the API (e.g., SAFEElastic API) to work at different levels of abstraction and in different languages.

Various implementations of the prototype are configured to provide a high-level REST API similar to the high-level REST API of Elasticsearch. Various embodiments are further configured to provide a low-level API (e.g., similar to the one provided by Elasticsearch), and in further example, that are configured to use considerably fewer dependencies. In addition, some embodiments, are configured to not depend on a particular version of an Elasticsearch server. In other embodiments, the system is configured to expand the API to other languages.

Document Based NO SQL Example

MongoDB is a highly-scalable NoSQL database that provides a document store interface. MongoDB stores documents in a JSON-like format and provides rich query expressiveness. There are several ways to interact with a MongoDB database server including shell commands or using a client-side API (known as a driver) written in more than 15 languages. Similar to SAFEDynamoDB and SAFEElastic, various embodiments are configured to improve end to end encryption in the MongoDB architecture, where the encryption functionality does not require any modifications to the server (e.g., the MongoDB backend). For example, the system includes an API built on top of the MongoDB driver and that is configured to provide encrypted full-text search operations.

Example Technical objectives. In order to build SAFEMongoDB, the above technical objectives described for SAFEElastic are implemented in various combinations. For example, various embodiments are configured for any one or more and/or any combination of the following:

(obj 1): Similar to SAFEElastic, a new emulator is constructed for SAFEMongoDB. Various embodiments include an emulator configured to transform structured encryption schemes to function on an unmodified MongoDB database. According to one example, the emulator implementation is configured based on the API and includes features different from the emulation designed for SAFEElastic.

(obj 2): Similar structured encryption schemes are employed with MongoDB.

(obj 3): Various embodiments leverage the parallelism provided by the plaintext API to reduce the costs of execution. Additional optimizations are available around the storage complexity, the query complexity, and the number of round trips relative to SAFEElastic.

AWS DynamoDB, Elasticsearch and MongoDB are some of the most widely used non-relational databases. Although various embodiments are tailored to popular database implementations, various aspects are described that permit application to a wider set of systems, and in some examples, the systems and methods described are ubiquitous across database platform or architecture.

The inventors have realized that some of the potential backends under consideration are Redis, Cassandra, and CouchDB, and generalization to other NoSQL databases is outlined based on the work described above (e.g., with respect to DynamoDB and Elasticsearch). Further embodiments will not require any change to the respective backend and employ similar underlying cryptographic primitives such as (range or pattern) multi-map encryption schemes discussed above. However, the emulation techniques can include different approaches to account for the underlying API of each backend. Various embodiments can be configured to achieve the following: identify common features for categorization of non-relational databases based on how emulation is implemented (e.g., hypergraph, encryption primitives, etc.). As an example, both DynamoDB and MongoDB share some similarities when it comes to how the client interacts with the database. Various embodiments are configured to exploit similar data operations and architectures. For example, as the cryptographic protocols are independent of the backend, categorization enables integration with existing backends and can also allow integration with newly developed backends.

According to some aspects, an emulation system can include any one or more and/or any combination of the following high-level details on example emulation schemes, new encrypted search protocols, as well as additional details on SAFEElastic prototype examples.

According to some aspects, encrypted search is the area that focuses on the design, cryptanalysis and implementation of protocols and corresponding systems that allow a client to encrypt its data and search over it privately. There are several cryptographic primitives that can be used to solve the encrypted search problem including: fully-homomorphic encryption (FHE), secure multi-party computation (MPC), structured encryption (STE), oblivious RAM (ORAM), and property-preserving encryption (PPE). Each of these primitives offers a different trade-off between security, efficiency and functionality. Various embodiments employ structured encryption as a foundation for cryptographic primitives and emulation functions.

According to various embodiments, the system implements structured encryption schemes to encrypt data structures in such a way that the encrypted data structures can be privately queried. Various forms of structured encryption are available. For example, some known approaches describe schemes that encrypt both a structure and a set of associated data items (e.g., documents, emails, user profiles etc.). Other forms are described that use structure-only schemes which only encrypt structures. Another distinction can be made between interactive and non-interactive schemes for structured encryption. Interactive schemes produce encrypted structures that are queried through an interactive two-party protocol, whereas non-interactive schemes produce structures that can be queried by sending a single message, i.e., the token. One can also distinguish between response-hiding and response-revealing schemes: where the former reveal the response to queries whereas the latter do not.

According to some aspects, the systems and methods formalize a new technique called emulation that makes STE schemes legacy-friendly. At a high-level, an emulator is a set of algorithms that "reshape" an encrypted data structure in such a way that it can be stored and queried as a different data structure. For example, one advantage of emulation is that it does not affect the leakage profile of the encrypted structure. Leakage profile is a set of stateful leakage patterns that capture the information disclosed to the adversary during the process of setup, query and update.

The inventors have realized that emulation can, however, affect storage and query complexity so an important goal when designing emulators is to minimize these overheads. The introduction of emulation fundamentally changes the landscape of encrypted search and alters conventional understanding of what is possible. Indeed, various emulation embodiments remove the only limitation of STE when compared to PPE, making STE comparable to PPE in terms of efficiency and legacy-friendliness, but superior in terms of security.

NoSQL Emulators Examples

NoSQL emulators can be configured to make STE schemes compatible with NoSQL systems. In various embodiments implemented on various NoSQL platforms, the underlying NoSQL emulators can vary. As an example, building an emulator for a key-value store can be different in execution from building an emulator for a document-store or a full-text search engine. Such differences can be due to several reasons including the data representation at the server side as well as the available API calls available in each platform. In various implementations, the underlying emulators, for example in SAFEDynamoDB, are different from the one in SAFEElastic. As discussed above, beyond reshaping the encrypted data structure, the complexity of emulation can depend on the degree of query expressiveness. As an example, because SAFEDynamoDB queries are not very expressive, the SAFEDynamoDB emulators can be less complex. Emulators can also be designed for expressive multi-map encryption schemes and encrypted pattern multi-map constructions.

Encrypted Range Search Scheme Examples

An overview of some embodiments is provided to illustrate. As an alternative to order-preserving and order-revealing encryption, several encrypted range structures have been proposed including the scheme that underlies Blind Seer, ARX-Range and the schemes of Faber et al. and Demerzis et al. These constructions are efficient and not vulnerable to snapshot attacks, but their leakage profile makes them vulnerable to a series of persistent attacks inspired by the work of Kellaris et al. While these attacks are mostly of theoretical interest due to the assumptions they rely on, nonetheless, the inventors realize that designing practical low-leakage encrypted range structures is an important open problem.

Accordingly, various embodiments provide an encryption system that includes a new framework for designing efficient encrypted range structures with low leakage. Stated generally, aspects of the approach use hypergraphs to transform range structures into a multi-map and encrypt the latter with a multi-map encryption scheme. The efficiency of the resulting construction can depend on several combinatorial properties of the hypergraph used in the transformation. With this in mind, explained are designs of different concrete hypergraphs, each of which leads to encrypted range structures with different trade-offs between storage overhead, query complexity and token size. By design, the leakage profiles of such schemes are immune to known range attacks that exploit the response identity pattern but not the volume pattern.

Example Implementation: a Framework for Designing Encrypted Range Structures.

The system can use a framework called "ERX" for designing encrypted range multi-maps. At a high-level, the approach consists of first transforming a range multi-map "RMM" into a standard multi-map—standard in the sense that it does not support range queries—and then encrypting it with a standard multi-map encryption scheme (see e.g., FIG. 1). In various embodiments, the RMM-to-MM transformation is determined by a hypergraph defined on the domain of the RMM. A hypergraph is a generalization of a graph where edges can join multiple vertices and a large number of RMM-to-MM transformations can be generated by instantiating the approach with a certain kind of hypergraph referred to as range hypergraphs (including, for example, the binary partition range hypergraph).

Hypergraph Construction Examples

According to one embodiment, one of the interesting properties of ERX is that the efficiency of the encrypted RMMs it produces depends on certain combinatorial properties of the hypergraph used. According to one example, because of this property, the framework can be referenced as "$ERX_H$" to highlight the connection to some underlying hypergraph H. Such properties can impact the scheme's leakage profile, its query and put complexities, its query and put token sizes and its storage overhead. Because of this, various embodiments include multiple architectures for the hypergraph, where each of the architectures achieve the tradeoffs one desires in practice (e.g., with respect to the scheme's leakage profile, its query and put complexities, its query and put token sizes and its storage overhead, etc.).

Example Hypergraphs Include:

- the ZigZag hypergraph which results in a scheme with optimal token size, (asymptotically) optimal query time, linear update time and multiplicative linear storage overhead.
- the Jagged hypergraph which results in a scheme with (asymptotically) optimal token size, (asymptotically) optimal query time, poly-logarithmic update time and multiplicative poly-logarithmic storage overhead.

In conjunction with hypergraphs above, various embodiments achieve the associated efficiency based on an ERX design that uses a standard optimal-time response-hiding multi-map encryption scheme.

Experimental Evaluation Examples

Each of the hypergraphs and the encrypted RMMs that result from them were tested. Again, the system employed an optimal multi-map encryption scheme as the underlying EMM. The evaluated instantiations had similar query efficiency but differed in terms of setup and put time. Based on this empirical evaluation (and a security analysis discussed below), good performance results from the binary partition hypergraph, although other designs can be used Evaluation of Resistance to Known Range Attacks.

As mentioned above, there are at least two kinds of range attacks to protect against. One example includes attacks that exploit the response identity and another includes attacks that exploit the volume pattern. Attacks that exploit volume are also applicable to ORAM-based solutions. Constructions that result from the framework described herein are response-hiding so they do not reveal the response identity by design. As such, they are not vulnerable to the former set of attacks. Furthermore, based on how the system instantiates ERX, it is volume-hiding, making it resistant to the latter. To the best of the inventors' knowledge the described constructions are the first non-trivial schemes to be secure against all previously-known range attacks.

Evaluation of Hypergraph Parametrization

While integrating ERX into SAFEDynamoDB, certain dimensions can greatly improve the efficiency of the encrypted range schemes depending on the use-case. For example, a new hypergraph, called binary partition hypergraph, is used, which results in a scheme with (asymptotically) optimal token size, (asymptotically) optimal query time, logarithmic update time and multiplicative logarithmic storage overhead. To reduce the storage overhead, the construction includes a density parameter that trades storage for false positives. False positive here refers to a result that has been added to the query response but is not part of the correct response.

This parameter modifies the structure of the hypergraph, and beyond improving storage, it also improves the update time of the scheme. In various examples, the way the density parameter is selected depends on the distribution of the numeric data as well as the size of the domain. In addition, prior-knowledge of the query space can considerably improve the storage overhead and the update time as well. For example, this prior-knowledge can be captured in the form of a second parameter that defines the size of the queries. Either or both of these parameters can be used in some embodiments, and can, for example, be fixed at setup time (e.g., cannot be modified later on unless a rebuild operation occurs).

Example Encrypted Pattern Search Scheme

According to another aspect, pattern search over a document collection allows a user to retrieve all the documents that match a given pattern. As an example, a pattern can be equal to a substring or a set of substrings. Special cases of pattern search are prefix or suffix search where the client is interested in fetching documents that contain keywords that start or end with a specific string. Pattern search over a plaintext data collection is a solved problem with many solutions depending on the use-cases. However, very few solutions exist when it comes to pattern search over an encrypted document collection. With respect to expressiveness goals, the design of a pattern multi-map encryption scheme has already been integrated into SAFEElastic. Below are discussed existing solutions that provide a high level description of EPX, a pattern multi-map encryption scheme.

Example Overview of EPX

A simple and efficient way to implement prefix or suffix search can be achieved based on order-preserving and order-revealing encryption. The inventors have realized that such an approach, however, offers weak security guarantees due to the underlying leakage of the PPE (property preserving encryption) primitives.

To resolve at least some of the issues with other approaches, various embodiments employ EPX, a new framework for encrypted pattern search schemes that yield schemes with sub-linear search time, (asymptotically) optimal storage overhead, and an (asymptotically) optimal update time. This framework is similar to ERX in that it also makes use of a multi-map encryption scheme as a building block, and reduces the design of EPX to the design of the underlying pattern hypergraph.

Example Pattern Hypergraph Construction.

Similar to ERX, EPX's design is linked to the underlying hypergraph. In one example, EPX description follows:

- Given a set of strings, a suffix trie is built—a tree structure that allows for pattern search. This suffix trie is then transformed to a set of numerical values to which the system can apply techniques similar to the ones discussed above (including the way to query, update, etc.). For example, this structure also benefits from hypergraph parameterizations which provide better performance throughout deployments.

Figure 11:
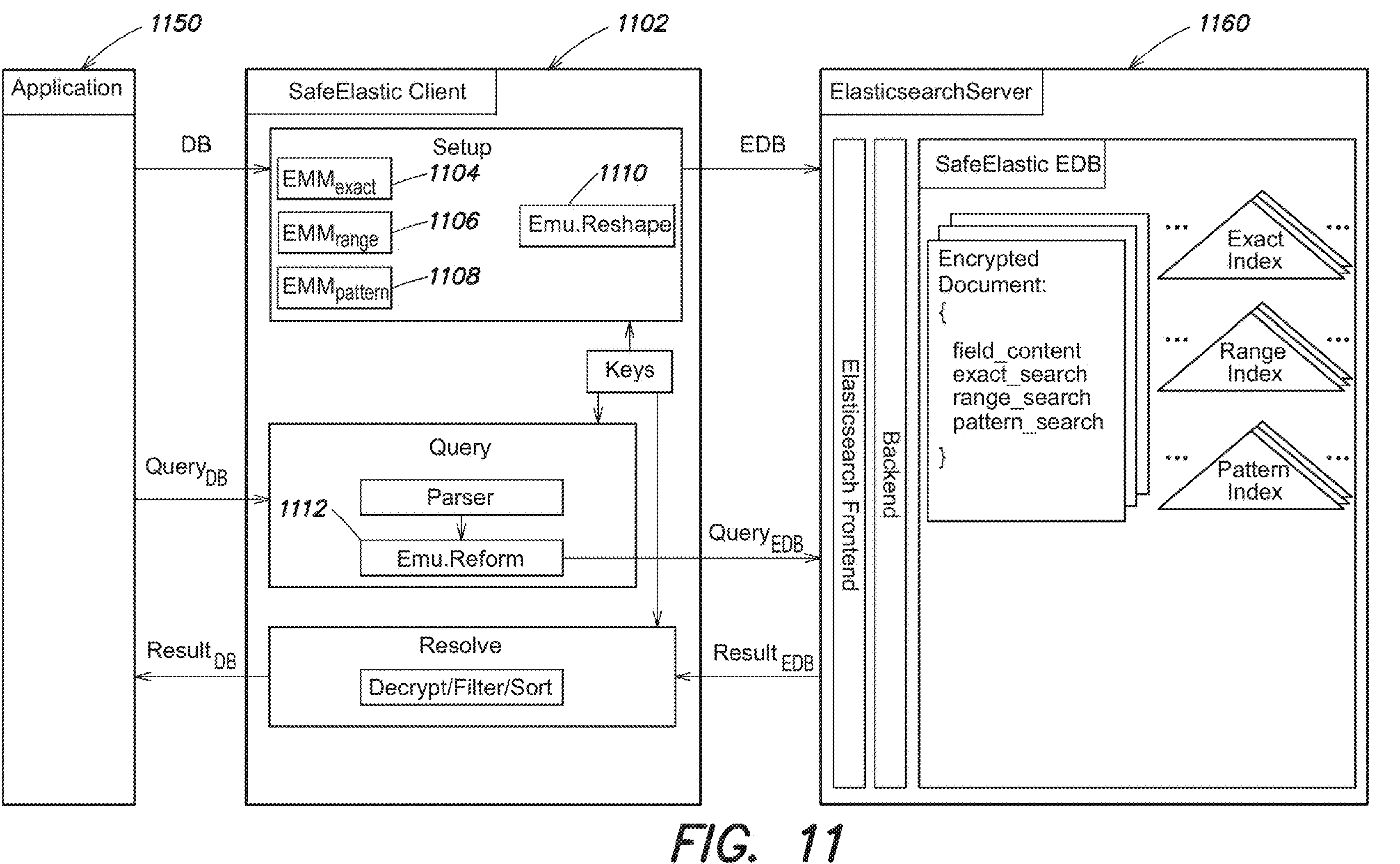
FIG. 11 is a block diagram of an example implementation & architectural design.

FIG. 11 is a block diagram of an example SAFEElastic implementation & architectural design. As shown in the Safe architecture, SafeElastic Client 1102 use setup operations to transform plaintext data (e.g., DB 1152) into an encrypted format where EMMexact 1104 refers to a multi-map encryption scheme; EMMrange 1106 refers to a range multi-map encryption scheme; and EMMpattern 1108 refers to a pattern multi-map encryption scheme. Emu.Reshape 1110 and Emu.Reform 1112 are the setup and token emulation protocols, respectively. The setup protocol produces keys (e.g., 1120) as describe above, that are employed in query processing (e.g., Parser (e.g., 1122) either accepts queries on encrypted values or transforms a plaintext query (e.g., 1154) to be executed on the encrypted date (e.g., generates the search tokens described above), the encrypted results returned can be decrypted by a resolve process 1124. In addition, the resolve process can eliminate false positive from results, filter and/or sort decrypted data for output at 1156. FIG. 11 shows the interplay between an application 1150, client 1102 and server 1160.

Figure 12:
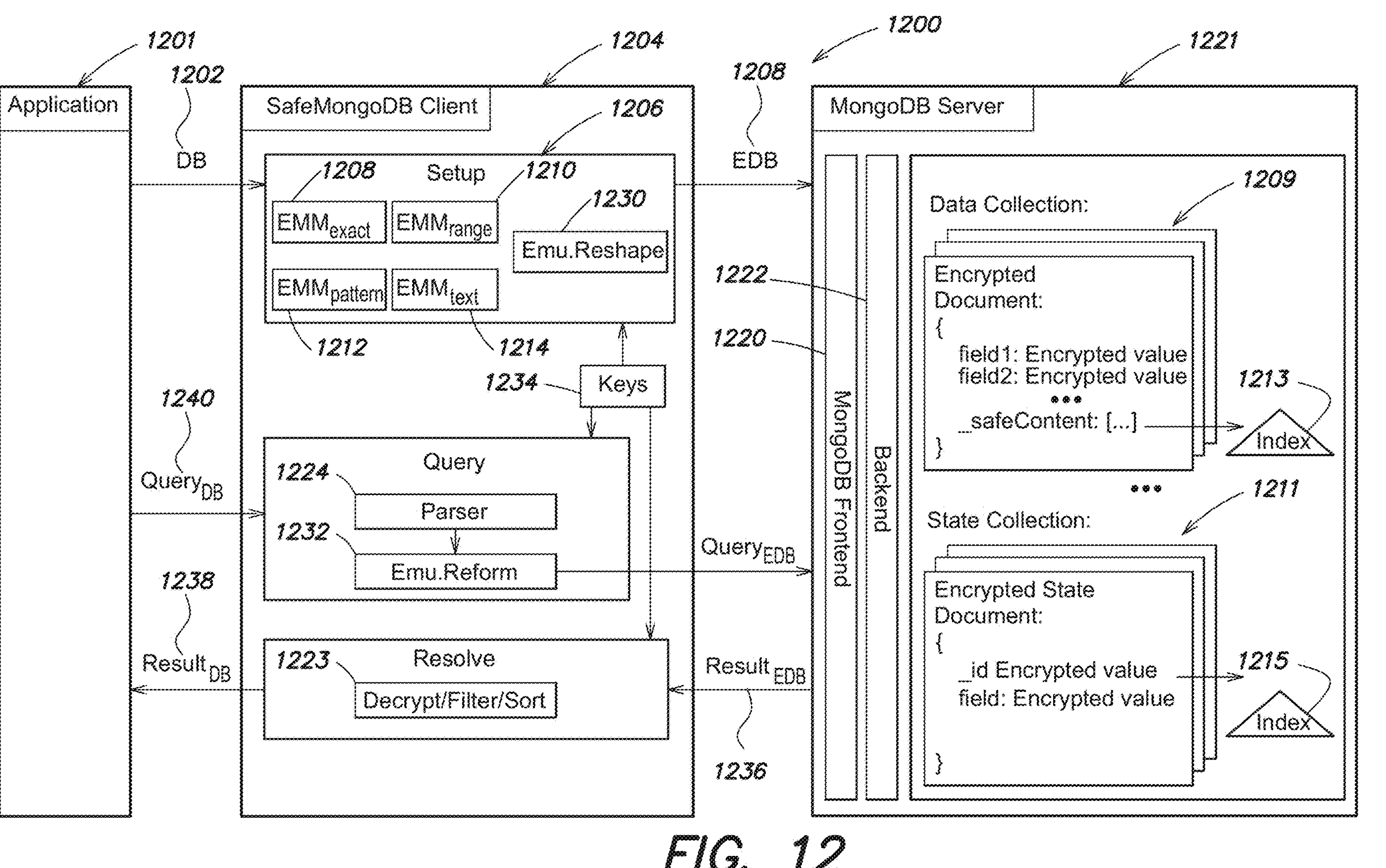
FIG. 12 is a block diagram of an example implementation, according to one embodiment.

FIG. 12 is a block diagram 1200 of an example SafeMongoDB implementation and architecture. As shown in the Safe architecture, SafeMongoDB Client 1104 use setup operations (e.g., 1206) to transform plaintext data (e.g., DB 1202) into an encrypted format (e.g., EDB 1208) that is hosted by a commercially available MongoDB server 1221 including a front 1220 and backend 1220. The encrypted database (e.g., EDB 1208) can include data collections 1209 and 1211 holding encrypted documents produced from the setup operation at the client along with an index (e.g., 1213 and 1215) on the encrypted data. In one example, collection 1211 is a collection of state information, which can be accessed by the index 1215 on the encrypted state information. In some embodiments, the encrypted state database can be used to enable stateless operation of encrypted search. For example, clients 1204 can query the server 1221 to support put and get operations on the data collection 1209 and manage accessing and/or updating of state information by multiple clients (e.g., 1204).

According to one embodiment, EMMexact 1208 refers to a multi-map encryption scheme; EMMrange 1210 refers to a range multi-map encryption scheme; EMMpattern 1212 refers to a pattern multi-map encryption scheme; and EMMtext 1214 refers to a text multi-map encryption scheme. In further embodiments, Emu.Reshape 1230 and Emu.Reform 1232 illustrate the setup and token emulation protocols, respectively. The setup protocol 1206 produces keys (e.g., 1234) as describe above, that are employed in transforming plaintext data and query processing. For example, a parser (e.g., 1222) either accepts queries on encrypted values or transforms a plaintext query (e.g., 1240) to be executed on the encrypted data hosted on the MongoDB server 1221. As shown the client 1204 is configured to generate the search tokens described above to process exact, range, pattern, and/or text queries. The encrypted results 1236 returned can be decrypted by a resolve process 1223. In addition, the resolve process 1223 can eliminate false positive from results, filter and/or sort decrypted data for output at 1238.

FIG. 12 shows the interplay between an application 1201, client 1204 and server 1221. Other architectures can be used with end to end encryption, and for example, the client can already have a plaintext database, accept queries from end users, and/or return results directly, according to some embodiments. In further embodiments, the client 1204 can manage interactions with hybrid databases hosted on a server. For example, some data may be designated for end to end encryption and other data units or data portion can be in a plaintext or unencrypted format. In some examples, the client is configured to maintain metadata on data targets, so the client can selectively invoke encrypted search operations and selectively invoke plaintext or native search functions. In further examples, the client can trigger both encrypted search and plaintext search in response to a query and reconcile the outputs from both types of search.

Evaluations of Attacks Against Pattern Search.

There is currently no known attack that explicitly targets STE-based pattern search schemes. However, this does not imply that existing schemes are immune to future attacks. With this in mind, pattern search embodiments followed the same philosophy as ERX and include a framework design under which different scheme constructions can achieve different leakage profiles. These different constructions enable tailoring of the schemes as a function of future cryptanalytic results.

SAFEElastic Embodiments

Example prototypes supports exact, range, boolean, prefix, suffix and substring search operations. Various prototypes are implemented using Java language and use as dependency the Elasticsearch RESTful API (e.g., elasticsearch-rest-high-level-client version 7.2.1). The Elasticsearch API is configured to manage necessary connections to the Elasticsearch server including but not limited to the creation and deletion of indexes, and the search operations. One example implementation of the prototype is done using Java and has 10,138 lines of code measured using CLOC.

This following library contains the implementation of basic cryptographic building blocks such as block ciphers, hash functions, and pseudo-random functions that the system employs in the cryptographic protocols. Since Elasticsearch stores documents in a JSON format, it can invoke Jackson version 2.10.1 to manipulate the content of both plaintext and encrypted documents.

Evaluation Examples on Efficiency

SAFEElastic embodiments were tested to measure the time to perform different operations and compared the performance numbers to plaintext (unmodified) Elasticsearch. Evaluation included 200,000 documents with a total of 6,000,000 documents (counting sub-documents). The evaluation was done locally on a MacBook Pro 2.7 GHZ Intel Core i7 with 16 GB of RAM. We used an example of Elasticsearch having version 7.2.

Summarized Below are Some Results:

(setup time): it takes 40 mins to store the plaintext documents and 67 minutes to store the encrypted documents. This amounts to a multiplicative factor of 1.6. This can be improved by incorporating further parallelism at the client side.

(space): to store 200,000 documents, Elasticsearch uses 575 MB for plaintext storage and 9.5 GB for encrypted storage. This amounts to a multiplicative factor of 16.5. There are several ways that the system can reduce the storage overhead such as reducing the number of fields that a user needs to make searchable.

(get operation): this operation retrieves one document based on a document identifier. It takes 0.54 milliseconds to retrieve a plaintext document and 0.95 milliseconds to retrieve an encrypted document which amounts to a multiplicative factor 1.75.

(Term/Terms search): term and terms search operations retrieve all documents where a field contains one keyword and multiple keywords specified by the client, respectively. In the case of a single keyword (term) search, the plaintext and encrypted search take 1.8 and 4.29 milliseconds to retrieve 5 documents, respectively, which amounts to a multiplicative factor of 2.38. In the case of multiple keywords (terms), the plaintext and encrypted search take 1.56 and 7.02 milliseconds to retrieve 5 documents respectively, which amounts to a multiplicative factor of 4.05. Also tested is how the search time of both term and terms search gets impacted when varying the selectivity (i.e., the number of retrieved documents). Increasing the selectivity from 5 to 100, observed that the encrypted search incurred a multiplicative factor of 3.9 and 4.29 over its plaintext counterpart for term and terms search, respectively.

(prefix/suffix search): prefix and suffix search operations retrieve all the documents where a field contains a value that starts or ends with a substring specified by the client, respectively. For this prototype, we limited the length of the substring to be more than 3 characters and less than 100 characters. The purpose of such limitations is to minimize the storage overhead but also to obtain a better leakage profile through the means of controlling the set of possible prefix and suffix queries. For a prefix composed of 4 characters, the plaintext and encrypted search take 2 and 7.76 milliseconds to retrieve 5 documents, respectively, which amounts to a multiplicative factor of 3.9. Similarly, we also varied the selectivity of the search from 5 to 100 to assess the impact of a larger result set on the search time. We observed that an encrypted prefix search incurs a multiplicative factor of 11.3 over a plaintext prefix search.

(pattern search): pattern search is a generalization of prefix and suffix where the client is interested to retrieve all documents where a specific substring exists. Similar to above, pattern search is also subject to the same limitations and for the same reasons. For a substring composed of 4 characters, the plaintext and encrypted search take 10 and 6.19 milliseconds to retrieve 5 documents, respectively, which amounts to a multiplicative factor of less than 1. The surprisingly low overhead is simply due to the extra pre-processing our structured encryption scheme requires. This pre-processing allows for faster lookups and does not exist in its plaintext counterpart. We have also varied the selectivity from 5 to 100 and we have observed a multiplicative factor of 5.35.

Example Stateless Considerations

According to some aspects, such end-to-end encryptions can be improved by implementing an emulator that provides stateless operations while maintaining end-to-end encryption. According to one embodiment, described is a dynamic multi-map encryption scheme (e.g., a variant of the $\pi_{bas^+}$ scheme), that is stateless, and how the system emulates this construction within a MongoDB database. According to various embodiments the stateless property improves any one or more and/or any combination of efficiency and security. Further, various embodiments describe a locking mechanism in order to maintain the same level of security guarantees relative to stateful operation. For example, the description provides for how the query and update protocols work when the state is stored in a MongoDB instance itself, enabling stateless operation.

There are known structured encryption (STE) schemes that encrypt a data structure in such a way that the data structure can be privately queried. Various embodiments of an emulation system (e.g., "SafeMongoDB") rely on various STE schemes in order to end-to-end encrypt collections in the well-known MONGODB database. For example, the encryption can be implemented in such a way that a MongoDB client can query the collection without the ability to decrypt it.

According to some embodiments, the nomenclature "Safe" is used in conjunction with known databases. The reference to "Safe" is intended to describe embodiments where end-to-end encryption has been implemented via emulation. Some embodiments of SafeMongoDB provide full encryption using native, off the shelf, or standard MongoDB database deployments. Further embodiments provide stateless operation for a dynamic schema database (e.g., a MongoDB database) via emulation that preserves end-to-end encryption.

The well-known MongoDB database supports a variety of different queries including: equality, range, text and regex search operations. To support these queries over encrypted data, the emulation system is configured to first index a collection using a variety of data structures, then encrypt these structures with appropriate STE schemes and, finally, emulate these structures on top of a MongoDB database.

To facilitate understanding of the functions associated with end-to-end encryption, some useful structures and operations are first described. A multi-map MM with capacity n is a collection of n label/tuple pairs $\{(\ell_i, v_i)_i\}_{i \le n}$ that supports Get and Put operations. $v_i$=MM[$\ell_i$] denotes an operation to get the tuple associated with label $\ell_i$ and MM[$\ell_i$]=$v_i$ denotes an operation to associate the tuple $v_i$ to label $\ell_i$. The label space is denoted by $\mathbb{L}$ and the set of labels stored in MM by $\mathbb{L}$. $MM^{-1}$[v] can refer to the set of labels in MM associated with tuples that include the value v. Multi-maps are the abstract data type instantiated by an inverted index. In the encrypted search literature multi-maps are sometimes referred to as indexes, databases or tuple-sets (T-sets). According to one embodiment, a dictionary "DX" is a special case of a multi-map where all tuples have a size equal to 1. Similarly, we denote by $\mathbb{L}$ the set of labels stored in DX.

In the area of encrypted search, typically considered are two types of adversaries: a snapshot adversary and a persistent adversary. The former adversary has access to the encrypted structure at multiple points of time but never sees the queries or updates. This models settings such as device thefts or short-term compromises where the database is never queried or updated during this duration. The latter adversary is more powerful in that it has not only access to the encrypted structure but also to all queries and updates made to the encrypted structure. The latter adversary models the setting of long-term compromise of the server hosting database services.

At a high level, various embodiments of the emulation system augment known dynamic schema databases (e.g., SafeElastic, SafeDynamoDB and SafeMongoDB, etc.) and make use of multiple kinds of encrypted data structures including at least one or combinations of the following: (1) an encrypted multi-map that supports (point) search queries; (2) an encrypted range multi-map which supports range queries; and (3) an encrypted pattern multi-map which supports operations like suffix, prefix and substring search. According to various embodiments, while encrypted range multi-maps and encrypted pattern multi-maps are much more complex than encrypted multi-maps, encrypted range multi-maps and encrypted pattern multi-maps can be built on top of encrypted (point) multi-maps ("EMMs"). The inventors have realized that a potential limitation of EMMs, however, is a potential requirement for the client to keep state-which means that all of the encrypted structures built on top of stateful structures are also stateful.

Stated broadly, state is not an issue when an EMM is used by a single client, however, it is realized that state can become a problem if the EMM is used by multiple clients. To illustrate, consider: (1) to query a stateful EMM, the client first needs to read the state before it can generate a query token; and (2) to update a stateful EMM, the client first needs to read and update the state before it can generate an add/put token. Thus, it follows that if there are multiple clients, each client will keep a local copy of the EMM's state, and each client needs to make sure that their copy is consistent (synced) with other state copies. Various embodiment of a stateless emulation system avoid this issue of keeping a local copy of the state consistent across multiple clients.

To continue, consider two clients that want to access the same EMM generated with a dynamic multi-map encryption scheme (e.g., examples described above). The state of the encryption scheme consists of a counter for every label in the multi-map and can be represented using a dictionary data structure $DX_{st}$ that stores pairs of the form (l count), where l is a label in the multi-map MM and count is a counter (e.g., an integer that is incremented). To operate on the multi-map, both clients store a copy of the data structure $DX_{st}$ and ensure their copies are consistent ("in sync").

An example issue with such a setting is that if both clients desire to update the same label they have to have a consistent view on the associated counter, otherwise correctness and security do not hold. For applications where multiple clients access the same structure, there is a need to have a consistent state, and one first step towards solving this issue is to make the scheme stateless. Further embodiments highlight other requirements that can be implemented to improve stateless operation and to maintain the scheme's correctness, efficiency, and security. According to various embodiments, the emulation system can emulate the operation of a stateful EMM as described herein. As mentioned above, state can be represented as a dictionary $DX_{st}$ that maps labels to counters. For example, using the encryption scheme shown in FIG. 1 to encrypt a multi-map MM—the scheme will output a key K, an encrypted multi-map EMM and a state $DX_{st}$ such that $DX_{st}$ maps each label l in MM to a counter $count_l$ which is an integer value equal to the number of elements in l's tuple. In another example, if (l, v) is a label/tuple pair stored in MM, then $DX_{st}$ stores a pair (l, count=|v|).

In further stateful embodiments, to execute a get query on a label l, the client generates a search token tk by computing Token (K, st, l). As described herein, the Token algorithm parses the state st as $DX_{st}$ and queries state on l to retrieve the counter value $count_l$. The counter is used to generate a number of sub-tokens—$count_l$ of them. To add a value to an existing (or new) label l, the client generates a put token ptok using the pToken(K, st, (l,v)) algorithm. As described, the algorithm parses the state st as $DX_{st}$ and queries the state on l to retrieve the counter $count_l$. $count_l$ is then incremented by one (to reflect the addition of a new value) and is used to generate a put token.

According to some embodiments, the size of the state can grow linearly as a function of the number of new labels, but not as a function of the number of put operations. That is, the more labels the EMM stores, the larger the state can be, but put operations that are used to add elements to existing labels do not necessarily impact the size of the state.

According to various embodiments, there are multiple approaches that can be used to covert a stateful EMM to stateless operations. One example includes architecture to outsource the state to the server providing database services using oblivious RAM (ORAM). Thus, whenever a client needs to execute a get or put, the client can query and update the state via the ORAM. Such implementation provides good security guarantees, but adds a non-trivial number of rounds and communication overhead. Further embodiments on the stateless emulation implement a different approach that is highly efficient while still providing security.

Stated broadly, the stateless emulation and system makes the underlying encryption scheme stateless by encrypting its state $DX_{st}$ using a dynamic (response-hiding) dictionary encryption scheme and storing the encrypted dictionary $EDX_{st}$ at the server together with the encrypted multi-map EMM. The function provided by the dictionary encryption scheme includes support for overwriting existing values as needed. Using this approach, the server stores an encrypted multi-map EMM and an encrypted dictionary $EDX_{st}$ and the client stores the client key.

According to some embodiments, to add a new label/tuple pair (l, v) to EMM, the client first queries the state $EDX_{st}$ on l, which yields the following example cases:

- if $EDX_{st}$ does store a pair of the form (l, $count_l$) then the client recovers ciphertext ct=Enc ($K_c$, $count_l$). The client then decrypts the ciphertext and uses (and increments) the counter to prepare a put token for EMM. The client then generates a put token to add the pair (l, $count_l$+1) to $EDX_{st}$.
- if $EDX_{st}$ does not store a pair of the form (l, $count_l$), then the client generates a put token for EMM using a counter $count_l$=0 and generates a put token to add the pair (l, 1) to $EDX_{st}$.

According to further embodiments, a query EMM on a label l, yields the following example cases:

- for text search, the client first retrieves the counter $count_l$ from the outsourced state $EDX_{st}$ and uses it to generate a get token for EMM. If $EDX_{st}$ does not store such a counter for l, it means that the EMM does not store any information for l so there is no need to generate any get tokens for EMM.
- for exact, range and pattern operations the client interacts with the state slightly differently than for text queries. The reason is mostly due to usability and efficiency considerations but, also based on an effect on security. At a high level, for these types of queries the client retrieves results in λ-sized batches where λ is a parameter. Here, the client does not need to know counter values because the client will just keep retrieving batches until the EMM outputs no results. This, in turn, means that it does not need to access the state. Various embodiments can also include a threshold θ, such that if λ>θ then the client can retrieve all the values in a single batch which requires the client to access the state (as above).

According to some embodiments, the stateless encryption scheme has the same query and storage complexity as the stateful one but has a larger round complexity. For example, each put the client executes first needs to retrieve a counter from $EDX_{st}$. Each put, therefore, requires a total of 2 rounds. For exact, range and pattern queries: if $\lambda \leq \theta$, then the round complexity is $max_{\ell \in \mathbb{L}_{MM}}(count_\ell)/\lambda$; otherwise it is 2.

In further embodiments, the stateless version incurs a slight amount of additional leakage when compared to stateful implementation. The slight amount of leakage does not pose appreciable security risks. For example, against a snapshot adversary, the only additional leakage is the number of labels in the multi-map MM. Technically, the scheme ends up leaking less than this in practice due to how states are emulated. Against a persistent adversary, the additional leakage is minimal as well. For example, the setup leakage includes, in addition to the total number of pairs in MM, the number of labels in MM. The query leakage is similar except that forward-privacy is not achieved. Forward-privacy is, intuitively, the guarantee that updates cannot be linked with previous search operations.

Various embodiments of the stateful implementation described herein break this for the following reason-when a query on a label & occurs, the client queries the state $EDX_{st}$ to recover the appropriate counter $count_l$. At this point the server knows that $count_l$ is associated with a query that occurred at this time. Later, if the client wishes to do a put on the same label l, the client retrieves count, from the state $EDX_{st}$ before the client can generate a put token. The same (encrypted) counter is returned during both the put operation and the previous query operation, and thus, the server knows they are linked (they are on the same label).

In further examples, there are cases, however, where forward-privacy is achieved but it is not guaranteed in all cases. In particular, forward-privacy is achieved when for exact, range and pattern operations when $\lambda \leq \theta$ since, in these cases, the client does not need to access the state at all. In still other embodiments, when batch retrievals are used, the client can use sub-tokens for elements that are not stored in EMM. Where the same sub-tokens are later used (e.g., during a put operation) then the server can link the later use (e.g., the put) with the previous search.

The following description illustrates example features and functions for how state is stored, queried and updated in a dynamic schema database collection (e.g., MongoDB collection). According to one embodiment, when encrypting a multi-map MM using a dynamic multi-map encryption scheme, the output is an encryption EMM of MM and an encryption $EDX_{st}$ of the state $DX_{st}$. According to one example, the SafeMongoDB client will then use an emulator to store EMM and $EDX_{st}$ in a MongoDB collection. Various examples and embodiments herein describe how EMM is stored so to facilitate understanding the following description is focused on how $EDX_{st}$ is stored. In further embodiments, the SafeMongoDB client uses many stateless EMMs (e.g., an EMM, an encrypted range multi-map and an encrypted pattern multi-map, etc.) so many encrypted states are stored for each EMM. According to one embodiment, this complexity is handled by the emulation system creating a document collection that stores the emulated states of all the EMMs used by the client. Stated generally, the system can store the states of all the EMMs in one global state dictionary and then emulate that dictionary as a document collection.

According to some embodiments, the system is configured to store the states of the EMMs, as a new collection (e.g., called a "state collection"). The new state collection can be stored in conjunction with a collection that stores data (e.g., organized as documents). In one example, the documents that store data are referenced as the data collection. In further embodiments, the state collection can be composed of a set of documents such that each document corresponds to a label/counter pair in the global state dictionary. In some examples, the system has as many documents in the state collection as there are label/counter pairs in the global state dictionary. According to one embodiment, documents in the state collection can be composed of two fields: (1) an identifier _id; and (2) a value value. In further example, for a given label/counter pair (l, $count_l$) in the global state dictionary, the system is configured to create a document with _id=$F_K$(l) and value value=Enc ($K_e$, $count_l$). In one example, a document in the state collection holds the following values (here the values of the PRF (pseudo-random function) and the encryption are not accurate and are used just for illustration purposes):

```
{
  "_id" : "iJySFGtu2ZJ1en",
  "value" : "7asJCkyQJmLbU"
}
```

In various embodiments, storing the global state dictionary in a MongoDB instance can reveal to the server the total number of labels in the EMMs used, which can be correlated to the total number of fields in the original data collection. Another subtlety is that the bit-length of the values (the encrypted counters) could reveal to a snapshot adversary information about the counter and, therefore, about how many times the associated label appears in the document collection. Various embodiments are configured to mitigate these options. For example, the system can be configured to implement counters that all have the same bit-length. It is realized that this information can be revealed in a query leakage in a persistent adversary scenario, thus such information can be less of an issue than in an adversarial model.

According to some embodiments, the emulation system provides stateless EMMs to enable multiple clients to concurrently access and work with the same EMM. As discussed above, a challenge with concurrent access is that all the clients need to have a single and consistent view of the state. Based on embodiments that encrypt the state and store encrypted state on the server, consistency is achieved without requiring synchronization across multiple clients. As discussed, this implementation simplifies the problem with a single copy of the state. In further embodiments, additional challenges are identified and resolved. For example, the system is configured to make sure that the clients who access and update the state copy do so in an "organized" manner. According to some embodiments, the system is configured to prevent situations where two clients are modifying the state at the same time, or the situation where one client is reading state while another is modifying state.

In one embodiment, the system is configured to manage concurrent accesses to the state collection leveraging MongoDB's multi-document ACID transactions which are available in v. 4.0 and up. In various embodiments, the client and/or server can be configured to leverage database sessions to enable ACID properties on a dynamic schema database, and use sessions to manage concurrent access while holding ACID properties. In other embodiments (and for example different dynamic schema databases), the system can implement different locking mechanisms that ensure no conflicts on accessing, updating, and/or reading state. In one example, whenever a client needs to update the state collection, the system can require a lock on the documents that store the label/counter pair needed.

In some embodiments, the system implements an additional field for managing operation of a lock. An example of a document in the state collection follows:

```
{
  "_id" : "iJySFGtu2ZJ1en",
  "value" : "7asJCkyQJmLbU",
  "lock" : 1
}
```

According to various embodiments, the lock field is used to lock the state document at the query phase, and, for example, an in-place modification of the lock field can be used to trigger the effect of a pessimistic lock on the corresponding document.

As discussed above, accessing the state via transactions can be used to preserve security guarantees. In other embodiments, transactions are not required to achieve correctness. For example, if two clients access and update the same state document (the same label/counter pair) they use the same counter to generate their put tokens for the EMM. The result can be (possibly) two (encrypted) data documents storing the same PRF evaluation in the _index field. This does not affect search operations but can reveal to a snapshot adversary that both documents contain the same value. For example, if the system were to allow access to the state without transactions, the system could leak frequency information similar to what is leaked using property-preserving encryption.

In further embodiments, query operation can likewise be managed. For example, queries in SafeMongoDB access the state in two cases: (1) if the query is a text search; and (2) if $\lambda>\theta$ (for any query type). In one example, the system defines values for λ and θ as follows: for exact, text and pattern search, λ=10 and θ=1000, and for range search λ=5 and θ=1000. In other embodiments, different values can be used depending on an associated workload.

According to some embodiments, to query the state, the system is configured to call the find method on the state collection to retrieve the document that stores the (encrypted) label/counter pair needed. For example, given a label l (which can be a keyword, a stem or a hypergraph edge identifier depending on the query type) the system computes an equality filter on the field id with, as value, the PRF evaluation on the label. To illustrate:

```
Filters.eq("_id", iJySFGtu2ZJ1en)
```

According to various embodiments, the client accesses state before computing the search tokens for the EMM, in most circumstances. Accessing state can add some time to the query process since the client has to wait for one round trip before sending search tokens to the server to query the EMM. According to one embodiment, it is possible for the client to start querying the EMM before retrieving the necessary counters. For example, the system can be configured to query without retrieving the counter because the search tokens (e.g., in the dynamic multi-map encryption scheme) are generated with a counter that starts at a known value (e.g., 1) and the "counter" stored in the state is really just an upper bound. Thus, the client can already generate and send search sub-tokens while the client waits to retrieve the counter from the state. Such implementation can save time and improve latency, but the improvement can also be a disadvantage in that if the counter is small, forward privacy could be affected because the client might generate a number of sub-tokens that do not exist yet and which could, in turn, allow the server to link them to future updates.

According to further embodiments, the system is configured to update state. In one example, when an EMM needs to be updated, there are at least two steps that occur with respect to the state: (1) the appropriate label/counter pair is retrieved from the global state dictionary or, in other words, the document that stores the (encrypted) label/counter pair is retrieved from the state collection; and (2) the counter is updated. In further embodiments that support concurrent accesses, the system is configured to ensure that no other client updates this same document (i.e., label/counter pair) during these two steps. As discussed above, one example includes using MongoDB multi-document ACID transaction functionality and locking the document.

The following example is a Java code snippet that shows use of transaction functionality:

```
TransactionBody<String> txnBody=new TransactionBody<String>( ) {
public String execute( ) {
// (step 1) retrieve the counters
. . .
// (step 2) update the counters
. . .
}
try {
session.withTransaction (txnBody, txnOptions);
} catch (RuntimeException e) {
} finally {clientSession.close( );}
```

Other embodiments can employ the transaction functionality of MongoDB using other programming languages, and in yet other embodiments employ document locks outside of transaction functionality to prevent contention on state information. In various embodiments that employ transaction functionality, the operations are used to retrieve and update the label/counter pairs in state collection but are not required to access or modify the data collection.

In still other embodiments, the system is configured to manage document deletion and manage the associated impact on the underlying EMMs. For example, the system is configured to manage the impact on associated state information. Broadly stated, a document deletion results in label/tuple pairs being modified in the underlying EMMs which, in turn, results in making some counter values invalid. From a practical standpoint, making some counter values invalid means that when the client retrieves a counter $count_l$ from the state, there will be values in $\{1, \ldots, count_l\}$ for which the corresponding search sub-token will not retrieve anything from the EMM. According to some embodiments, there is no way the client can infer which values in $\{1, \ldots, count_l\}$ are valid or not. However, as long as the number of missing counter values is small, the impact on query efficiency is undetectable. Some embodiments can ignore missing counters. Some embodiments can monitor query efficiency and act at a threshold deterioration set on the system.

Other embodiments can implement solutions for resolving document deletion issues. An example approach is to store additional information in the value field of the state collection documents that describes which counter values are missing. The approach implements the idea that whenever the client queries for a label l, the client learns which sub-tokens retrieved values and which did not. If there is an interval of values for which there is no retrieval and if the size of this interval is larger than some parameter β (which is set on the system), then the client updates the label/counter pair in the state to store this interval. For example, in addition to storing a counter, the system stores the following:

label: d1, counter where d1 is an integer that represents the beginning of the deleted interval. If more missing intervals are found in the future, the client can update the value accordingly. In some embodiments, managing deletions includes representing state as a multi-map instead of representing the state as a dictionary. According to one embodiment, this results in encrypting state with a multi-map encryption scheme, which can include further modification to how state is emulated and stored. For example, the system can be configured to use more than one document in the state collection for the same label.

Another embodiment manages document deletion based on a rebuild protocol that periodically updates the data documents so that the PRF evaluations stored in the _index field are generated using a contiguous set of counter values. According to one embodiment, the rebuild approach can be computationally more expensive, thus rebuild functionality can be targeted to settings where the missing counter values are not contiguous to limit additional overhead.

Figure 13:
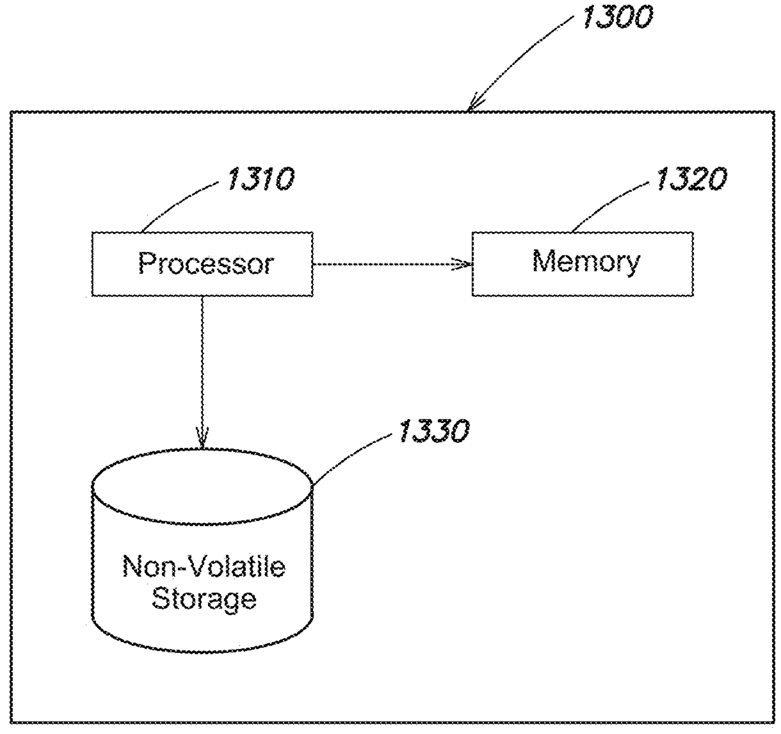
FIG. 13 is a block diagram of an example computer system improved by implementation of the functions, operations, and/or architectures described herein.

FIG. 13 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 1300 that may be used in connection with any of the embodiments of the disclosure provided herein is shown in FIG. 13. The computer system 1300 may include one or more processors 1310 and one or more articles of manufacture that comprise non-transitory computer-readable storage media (e.g., memory 1320 and one or more non-volatile storage media 13130). The processor 1310 may control writing data to and reading data from the memory 1320 and the non-volatile storage device 1330 in any suitable manner. To perform any of the functionality described herein (e.g., image reconstruction, anomaly detection, etc.), the processor 1310 may execute one or more processor-executable instructions stored in one or more non-transitory computer-readable storage media (e.g., the memory 1320), which may serve as non-transitory computer-readable storage media storing processor-executable instructions for execution by the processor 1310.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various one of the screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. An emulation system for end-to-end encryption of database data comprising:

at least one processor operatively connected to a memory, the at least one processor when executing configured to:

accept and respond to database queries made on a dynamic schema database using an emulation layer; wherein the emulation layer is configured to:

maintain data of the dynamic schema database so that designated data is always in an encrypted format comprising at least an encrypted multi-map data structure;

store encrypted state information associated with encrypted values of the designated data including data stored in the encrypted multi-map data structure;

execute queries against the designated data in at least the encrypted multi-map data structure with at least the encrypted state information;

return the output to any query on the designated data to a requesting client in an encrypted format; and maintain any output communicated from any query response in the encrypted format.

2. The system of claim 1, wherein at least the encrypted multi-map data structure includes an encrypted range hypergraph configured to process range based queries and an encrypted hypergraph configured to process point based queries against respective encrypted values of the designated data.

3. The system of claim 1, wherein the at least one processor is configured to transform plaintext data into the encrypted multi-map and the encrypted state information on client controlled resources.

4. The system of claim 3, wherein the at least one processor is configured to generate and encrypt a state dictionary that maps labels in an underlying multi-map to counters for each label as the encrypted state information.

5. The system of claim 3, wherein the at least one processor is configured to generate and encrypt a state multi-map, that associates labels in an underlying data multi-map to counters for each label, as the encrypted state information.

6. The system of claim 3, wherein the at least one processor is configured to manage concurrent access to the encrypted state information by controlling access with transactional access to the encrypted state information or locking operations on the encrypted state information.

7. The system of claim 1, wherein the at least one processor is configured to retrieve the encrypted state information.

8. The system of claim 7, wherein the at least on processor is configured to construct at least one token as part of a query on the designated data or an update to the designated data based, at least in part, on the retrieved encrypted state information.

9. The system of claim 8, wherein the at least one processor is configured to construct the at least one token comprising at least a cyphertext value and an index value.

10. The system of claim 8, wherein the at least one processor is configured to construct the at least one token comprising a sub token including at least a cyphertext value and index value for each counter in the encrypted state information associated with the cyphertext value being queried.

11. The system of claim 1, wherein the at least one processor is configured to construct a range token comprising vectors of sub tokens based, at least in part, on the retrieved encrypted state information.

12. A computer implemented method for enabling end to end encryption via emulation, the method comprising:

accepting and responding, by at least one processor, to database queries made on a dynamic schema database using an emulation layer;

maintaining, by the at least one processor, data stored on the dynamic schema database so that designated data is always in an encrypted format, including maintaining at least an encrypted multi-map data structure for the designated data;

storing, by the at least one processor, encrypted state information associated with the designated data;

executing, by the at least one processor, queries against the designated data in at least the encrypted multi-map data structure with at least the encrypted state information; and returning, by the at least one processor, the output to any query on the designated data to a requesting client in an encrypted format and maintaining any output communicated from the query response in the encrypted format.

13. The method of claim 12, wherein the method includes processing range based queries against at least one encrypted range hypergraph and processing point based queries against at least one encrypted hypergraph.

14. The method of claim 12, wherein the method further comprises transforming plaintext data into the encrypted multi-map data structure and storing the encrypted state information associated with the encrypted multi-map data structure.

15. The method of claim 14, wherein the method further comprises generating and encrypting a state dictionary that maps labels in an underlying multi-map to counters for each label as the encrypted state information.

16. The method of claim 14, wherein the method further comprises generating and encrypting a state multi-map that associates labels in an underlying data multi-map to counters for each label, as the encrypted state information.

17. The method of claim 14, wherein the method further comprises managing concurrent access to the encrypted state information by controlling access with transactional access to the encrypted state information or locking operations on the encrypted state information.

18. The method of claim 12, wherein the method further comprises retrieving the encrypted state information.

19. The method of claim 18, wherein the method further comprises constructing at least one token as part of a query on the designated data or an update to the designated data based, at least in part, on the retrieved encrypted state information.

20. The method of claim 19, wherein the method further comprises constructing the at least one token comprising at least a cyphertext value and an index value.

* * * * *